US012645995B2

(12) United States Patent
Ghazi et al.

(10) Patent No.: US 12,645,995 B2
(45) Date of Patent: Jun. 2, 2026

(54) TRAINING MACHINE-LEARNED MODELS WITH LABEL DIFFERENTIAL PRIVACY

(71) Applicant: Google LLC, Mountain View, CA (US)

(72) Inventors: Badih Ghazi, Santa Clara, CA (US);
Pritish Kamath, Mountain View, CA (US); Shanmugasundaram Ravikumar, Piedmont, CA (US); Ethan Jacob Leeman, Arlington, MA (US); Pasin Manurangsi, Bangkok (TH); Avinash Vaidyanathan Varadarajan, Los Altos, CA (US); Chiyuan Zhang, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 688 days.

(21) Appl. No.: 18/156,915

(22) Filed: Jan. 19, 2023

(65) Prior Publication Data
US 2024/0265294 A1     Aug. 8, 2024

(51) Int. Cl.
G06N 20/00      (2019.01)
(52) U.S. Cl.
CPC .................................... G06N 20/00 (2019.01)
(58) Field of Classification Search
CPC ...................................................... G06N 20/00
USPC ...................................................... 706/12, 25
See application file for complete search history.

(56) References Cited

U.S. PATENT DOCUMENTS

| | | | |
|---|---|---|---|
| 2018/0100862 A1* | 4/2018 | Goix | G01N 21/6486 |
| 2021/0174196 A1* | 6/2021 | Desmond | G06F 18/2321 |
| 2021/0357680 A1* | 11/2021 | Chen | G06N 3/047 |
| 2021/0397895 A1* | 12/2021 | Sun | G06N 3/045 |
| 2022/0068478 A1* | 3/2022 | Yu | G16B 25/10 |
| 2022/0340171 A1* | 10/2022 | Halder | G05D 1/0274 |

(Continued)

FOREIGN PATENT DOCUMENTS

| | | | | |
|---|---|---|---|---|
| CN | 114255381 A | * | 3/2022 | G06F 18/214 |
| WO | WO-2021195688 A1 | * | 10/2021 | G16H 50/20 |

OTHER PUBLICATIONS

Abadi et al., "Deep Learning with Differential Privacy", arXiv:1607.00133v2, Oct. 24, 2016, 14 pages.

(Continued)

*Primary Examiner* — Ruay Ho
(74) *Attorney, Agent, or Firm* — DORITY & MANNING P.A.

(57) ABSTRACT

An example method is provided for conducting differentially private communication of training data for training a machine-learned model. Initial label data can be obtained that corresponds to feature data. A plurality of label bins can be determined to respectively provide representative values for initial label values assigned to the plurality of label bins. Noised label data can be generated, based on a probability distribution over the plurality of label bins, to correspond to the initial label data, the probability distribution characterized by, for a respective noised label corresponding to a respective initial label of the initial label data, a first probability for returning a representative value of a label bin to which the respective initial label is assigned, and a second probability for returning another value. The noised label data can be communicated for training the machine-learned model.

20 Claims, 16 Drawing Sheets

*Baseline: Laplace Mechanism*

(56) References Cited

U.S. PATENT DOCUMENTS

| | | | | |
|---|---|---|---|---|
| 2023/0169323 A1* | 6/2023 | Kolagunda | .............. | G06N 3/08 |
| | | | | 706/25 |
| 2024/0005547 A1* | 1/2024 | Lin | .......................... | G06T 7/70 |

OTHER PUBLICATIONS

Badanidiyuru et al., "Handling Many Conversations Per Click in Modeling Delayed Feedback", arXiv:2101.02284v1, Jan. 6, 2021, 9 pages.

Beimel, "Private Learning and Sanitization: Pure vs. Approximate Differential Privacy", arXiv:1407.2674v1, Jul. 10, 2014, 45 pages.

Cameron et al., "Regression Analysis of Count Data", Cambridge University Press, 2013, 16 pages.

Cao et al., "Data Poisoning Attacks to Local Differential Privacy Protocols", arXiv:1911.02046v2, Dec. 9, 2020, 18 pages.

Chaudhuri et al., "Differentially Private Empirical Risk Minimization", arXiv:0912.0071v5, Feb. 16, 2011, 40 pages.

Chaudhuri et al., "Sample Complexity Bounds for Differentially Private Learning", Twenty-fourth Annual Conference on Learning Theory, vol. 19, 2011, pp. 155-186.

Diakonikolas et al., "Differentially Private Learning of Structured Discrete Distributions", Advances in Neural Information Processing Systems 28, 2015, 9 pages.

Dwork et al., "The Algorithmic Foundations of Differential Privacy" Foundations and Trends® in Theoretical Computer Science, vol. 9, Issue 3-4, Aug. 2014, pp. 211-407.

Dwork et al., "Calibrating Noise to Sensitivity in Private Data Analysis", Theory of Cryptography, Third Theory of Cryptography Conference, TCC 2006, New York, New York, United States, Mar. 4-7, 2006, 20 pages.

Dwork et al., "Our Data, Ourselves: Privacy via Distributed Noise Generation", International Conference on the Theory and Application of Cryptographic Techniques, May 28, 2006, pp. 486-503.

Esfandiari et al., "Label Differential Privacy Via Clustering", arXiv:2110.02159v1, Oct. 5, 2021, 24 pages.

Geng et al., "The Optimal Mechanism in Differential Privacy", arXiv:1212.1186v3, Oct. 30, 2013, 40 pages.

Ghazi et al., "Deep Learning with Label Differential Privacy", arXiv:2102.06062v2, Oct. 26, 2021, 29 pages.

Ghazi et al., "Differentially Private Aggregation in the Shuffle Model: Almost Central Accuracy in Almost a Single Message", arXiv:2109.13158v1, Sep. 27, 2021, 31 pages.

Ghazi et al., "Regression with Label Differential Privacy", arXiv:2212.06074v1, Dec. 12, 2022, 29 pages.

Ghosh et al., "Universally Utility-Maximizing Privacy Mechanisms", arXiv:0811.2841v3, Mar. 20, 2009, 16 pages.

Kairouz et al., "Advances and Open Problems in Federated Learning", arXiv:1912.04977v3, Mar. 9, 2021, 121 pages.

Kairouz et al., "Extremal Mechanisms for Local Differential Privacy", arXiv:1407.1338v3, Nov. 19, 2015, 52 pages.

Kingma et al., "Adam: A Method for Stochastic Optimization", arXiv:1412.6980v9, Jan. 30, 2017, 15 pages.

Li et al., "Label Leakage and Protection in Two-party Split Learning", arXiv:2102.08504v3, May 24, 2022, 27 pages.

Loshchilov et al., "SGDR: Stochastic Gradient Descent with Warm Restarts", arXiv:1608.03983v5, May 3, 2017, 16 pages.

Malek et al., "Antipodes of Label Differential Privacy: PATE and ALIBI", arXiv:2106.03408v2, Oct. 29, 2021, 17 pages.

McSherry et al., "Mechanism Design via Differential Privacy", Forty-eighth Annual Institute of Electrical and Electronics Engineers Symposium on Foundations of Computer Science, Providence, Rhode Island, United States, Oct. 20-23, 2007, pp. 94-103.

Papernot et al., "Scalable Private Learning with PATE", arXiv:1802.08908v1, Feb. 24, 2018, 34 pages.

Papernot et al., "Semi-supervised Knowledge Transfer for Deep Learning from Private Training Data", arXiv:1610.05755v4, Mar. 3, 2017, 16 pages.

Radebaugh et al., "Introducing TensorFlow Privacy: Learning with Differential Privacy for Training Data", Mar. 6, 2019, https://blog.tensorflow.org/2019/03/introducing-tensorflow-privacy-learning.html, Retrieved on Apr. 6, 2023, 7 pages.

Schuh, "Building a More Private Web: A Path Towards Making Third Party Cookies Obsolete", Jan. 14, 2020, https://blog.chromium.org/2020/01/building-more-private-web-path-towards.html, retrieved on Apr. 6, 2023, 4 pages.

Song et al., "Stochastic Gradient Descent with Differentially Private Updates", 2013 Institute of Electrical and Electronics Engineers Global Conference on Signal and Information Processing, Austin, Texas, United States, Dec. 3-5, 2013, pp. 245-248.

Tallis et al., "Reacting to Variations in Product Demand: An Application for Conversion Rate (CR) Prediction in Sponsored Search", arXiv:1806.08211v1, May 25, 2018, 9 pages.

Tang et al., "Machine Learning with Differentially Private Labels: Mechanisms and Frameworks", Proceedings on Privacy Enhancing Technologies, Issue 4, 2022, pp. 332-350.

Wang et al., "Answering Multi-Dimensional Analytical Queries under Local Differential Privacy", Special Interest Group on Management of Data '19: Proceedings of the 2019 International Conference on Management of Data, Amsterdam, The Netherlands, Jun. 30-Jul. 5, 2019, pp. 159-176.

Wang et al., "On Sparse Linear Regression in the Local Differential Privacy Model", Institute of Electrical and Electronics Transactions on Information Theory, vol. 67, No. 2, Feb. 2022, 19 pages.

Warner, "Randomized Response: A Survey Technique for Eliminating Evasive Answer Bias", Journal of the American Statistical Association, vol. 60, Issue 309, 1965, pp. 63-69.

Wilander, "Full Third-Party Cookie Blocking and More", Mar. 24, 2020, https://webkit.org/blog/10218/full-third-party-cookie-blocking-and-more/, retrieved on Oct. 3, 2023, 8.

Wood, "Today's Firefox Blocks Third-Party Tracking Cookies and Cryptomining by Default", Sep. 3, 2019, https://blog.mozilla.org/en/products/firefox/todays-firefox-blocks-third-party-tracking-cookies-and-cryptomining-by-default/, retrieved on Apr. 6, 2023, 7 pages.

Yousefpour et al., "Opacus: User-Friendly Differential Privacy Library in PyTorch", arXiv:2109.12298v4, Aug. 22, 2022, 18 pages.

Zhang et al., "Functional Mechanism: Regression Analysis under Differential Privacy", arXiv:1208.0219v1, Aug. 1, 2012, 12 pages.

* cited by examiner

First Computing System(s) 410

Label Source 102

Initial Label Data 104

Label Noising Model 110

Noised Label Data 120

Second Computing System(s) 420

Model Trainer 140

Training Data 142

Machine-Learned Model(s) 144

Feature Source 106

Feature Data 108

*Baseline: Laplace Mechanism*

*RR-on-Bins*

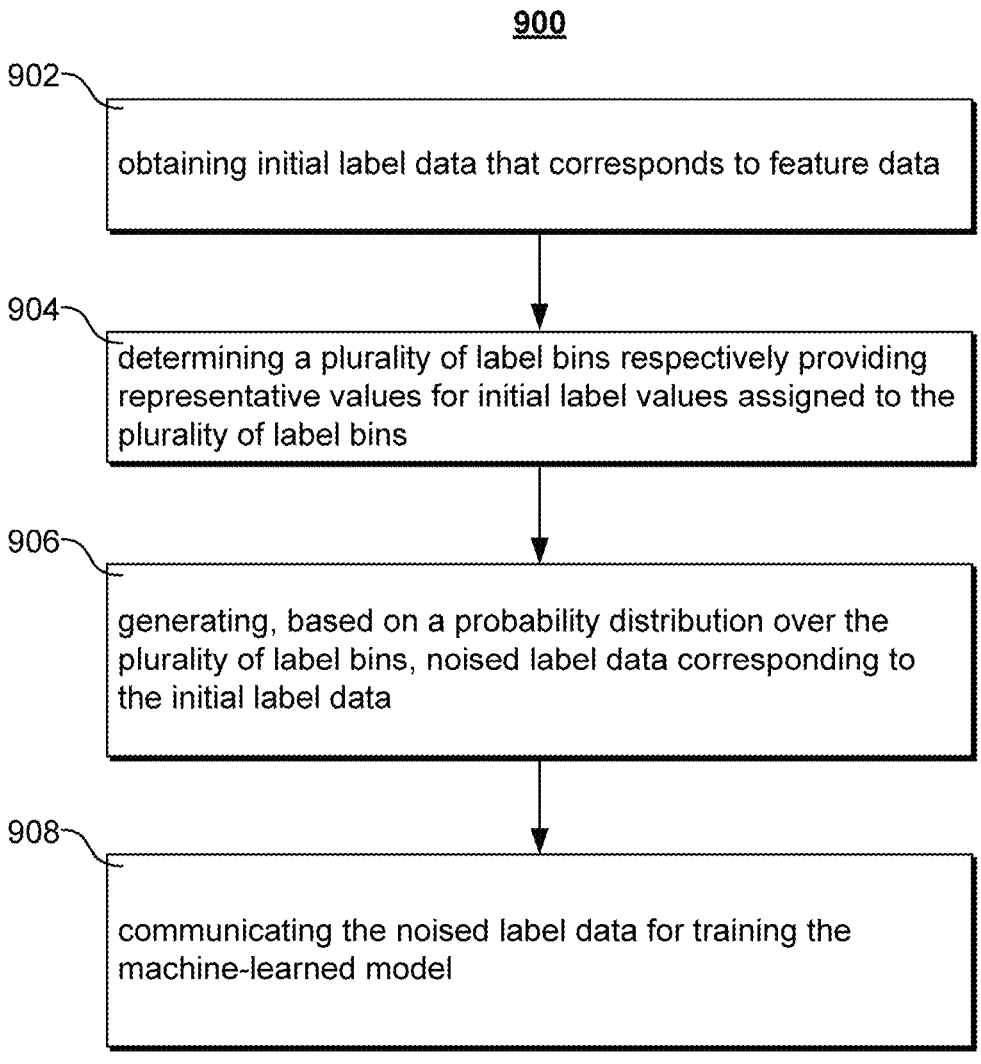

900

902 — obtaining initial label data that corresponds to feature data

904 — determining a plurality of label bins respectively providing representative values for initial label values assigned to the plurality of label bins 906 — generating, based on a probability distribution over the plurality of label bins, noised label data corresponding to the initial label data 908 — communicating the noised label data for training the machine-learned model

Figure 9

TRAINING MACHINE-LEARNED MODELS WITH LABEL DIFFERENTIAL PRIVACY

FIELD

The present disclosure relates generally to machine learning. More particularly, the present disclosure relates to training and implementing machine learning models with differential privacy on label data.

BACKGROUND

Machine-learned models can be trained on datasets of training examples. Differentially private training techniques can obscure the influence of any given training example on the trained model.

SUMMARY

Aspects and advantages of embodiments of the present disclosure will be set forth in part in the following description, or can be learned from the description, or can be learned through practice of the embodiments.

In one example aspect, the present disclosure provides an example computer-implemented method for differentially private communication of training data for training a machine-learned model. The example method can include obtaining, by a computing system having one or more processors, initial label data that corresponds to feature data. The example method can include determining, by the computing system, a plurality of label bins respectively providing representative values for initial label values assigned to the plurality of label bins. The example method can include generating, by the computing system and based on a probability distribution over the plurality of label bins, noised label data corresponding to the initial label data. In the example method, the probability distribution can be characterized by, for a respective noised label corresponding to a respective initial label of the initial label data: a first probability for returning a representative value of a label bin to which the respective initial label is assigned, and a second probability for returning another value. The example method can include communicating, by the computing system, the noised label data for training the machine-learned model.

In one example aspect, the present disclosure provides an example computing system for conducting differentially private communication of training data for training a machine-learned model. The example system can include one or more processors. The example system can include one or more non-transitory computer-readable media storing instructions that are executable by the one or more processors to cause the computing system to perform example operations. The example operations can include obtaining initial label data that corresponds to feature data. The example operations can include determining a plurality of label bins respectively providing representative values for initial label values assigned to the plurality of label bins. The example operations can include generating, based on a probability distribution over the plurality of label bins, noised label data corresponding to the initial label data. In the example operations, the probability distribution can be characterized by, for a respective noised label corresponding to a respective initial label of the initial label data: a first probability for returning a representative value of a label bin to which the respective initial label is assigned, and a second probability for returning another value. The example operations can include communicating the noised label data for training the machine-learned model.

In one example aspect, the present disclosure provides one or more example non-transitory computer-readable media storing instructions that are executable by one or more processors to cause an example computing system to perform example operations. The example operations can include obtaining initial label data that corresponds to feature data. The example operations can include determining a plurality of label bins respectively providing representative values for initial label values assigned to the plurality of label bins. The example operations can include generating, based on a probability distribution over the plurality of label bins, noised label data corresponding to the initial label data. In the example operations, the probability distribution can be characterized by, for a respective noised label corresponding to a respective initial label of the initial label data: a first probability for returning a representative value of a label bin to which the respective initial label is assigned, and a second probability for returning another value. The example operations can include communicating the noised label data for training the machine-learned model.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to describe the related principles.

BRIEF DESCRIPTION OF THE DRAWINGS

Detailed discussion of embodiments directed to one of ordinary skill in the art is set forth in the specification, which makes reference to the appended figures, in which:

FIG. 9 is a flow chart diagram of an example method for generating training datasets according to example aspects of some embodiments of the present disclosure.

Figure 1:
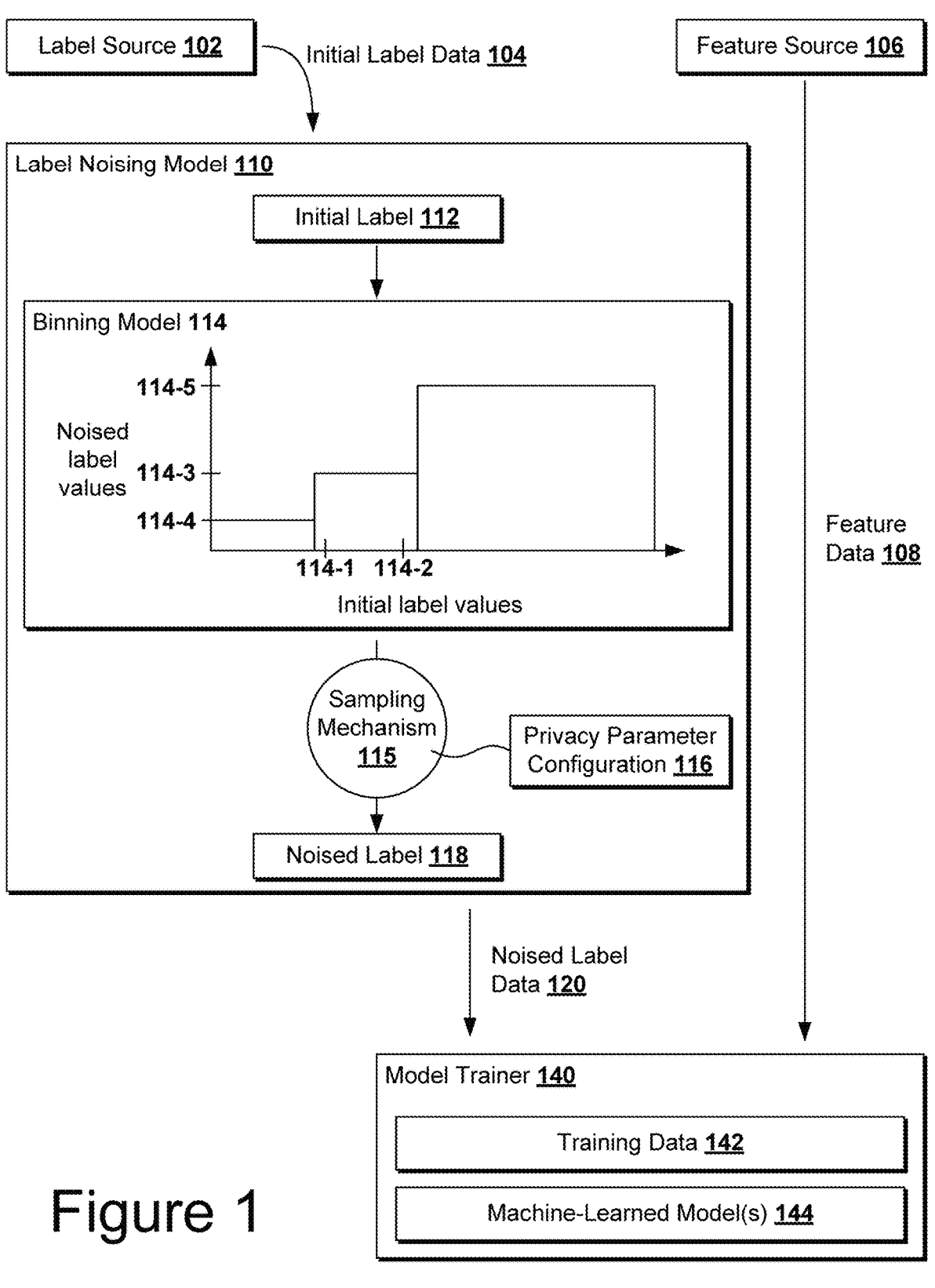
FIG. 1 is a block diagram of an example system for generating training datasets according to example aspects of some embodiments of the present disclosure.

Reference numerals that are repeated across plural figures are intended to identify the same features in various implementations.

DETAILED DESCRIPTION

Overview

Example aspects of the present disclosure provide for generating training data for training machine-learned models in a differentially private manner. In particular, example implementations can maintain differential privacy over a set of training labels by noising the label data with a label noising model. For training models for regression tasks, the label noising model can receive a set of raw input labels and perform noisy quantization. For instance, the label noising model can be configured to bin the raw input labels and, with configurable probabilities, return either the assigned bin value or a randomly sampled bin value. The label noising model can be optimized in view of a quantization loss (e.g., as evaluated using a regression loss). In this manner, a set of noised training labels can be generated such that differential privacy is maintained in the output/communication of the training label set.

For instance, machine-learned models can be trained to perform various tasks by supervising the model's performance over an input set of training feature data by comparing an output set of predicted label outputs with established training label data. Generating training data can include curating the set of training feature data with the associated training label data. In some situations, the training feature data and training label data are associated with different systems or different entities. Advantageously, example aspects of the present disclosure provide for generating training label data that can be shared across different systems, entities, or otherwise communicated using messages that satisfy differential privacy criteria (e.g., for E-differential privacy, etc.).

At a high level, differential privacy can guarantee that output model weights are statistically indistinguishable when any single training example is arbitrarily modified. Differential privacy can also apply to datasets: differential privacy can guarantee that a dataset is statistically indistinguishable when any single contributor to the dataset is omitted.

Numerous differential privacy training algorithms have been proposed, with open-source libraries tightly integrated in popular machine learning frameworks such as TensorFlow Privacy (Radebaugh & Erlingsson, *Introducing TensorFlow Privacy: Learning with Differential Privacy for Training Data*, March 2019) and PyTorch Opacus (Yousefpour et al., *Opacus: User-friendly diferential privacy library in PyTorch*, arXiv preprint arXiv:2109.12298, 2021).

As mentioned above, in the context of supervised machine learning, a training example can include input features and a target label. While many existing research works focus on protecting both features and labels (e.g., Abadi et al., Deep learning with differential privacy, In CCS, pp. 308-318, 2016), there are also some important scenarios where the input features are already known to the "adversary," or other system or entity outside a boundary of a trusted environment. In such a scenario, there is generally no purpose in computing privatized feature data, since the original feature data is already exposed.

Label differential privacy can be achieved when the statistical indistinguishability is required only when the label of a single example is modified. The value of label differential privacy can be seen in many practical examples. For instance, one example arises from cross-platform or cross-system processing of user experiences. Features may be known to one system (an upstream system that initiates a user experience, such as suggesting to execute an application), whereas downstream events, or the labels, may be known to another system (the application system). Thus, from the first system's perspective, only the labels might be treated as unknown and private.

Some prior works have addressed label differential privacy. Generally, however, existing approaches have yet been unable to provide satisfactory label differential privacy in the context of training machine-learned models for regression tasks.

Advantageously, example implementations of the present disclosure can provide for label differential privacy for regression tasks. For instance, example implementations can, given a global prior distribution (which, if unknown, could be estimated privately), derive a label differential privacy mechanism optimized under a given objective loss function (e.g., a regression objective). The mechanism can belong to a class of randomized response on bins that can be recast as a linear program for characterizing its optimum. With this characterization, an optimal mechanism among the class of randomized response on bins can be determined. An efficient algorithm for this task can be based on dynamic programming.

A prior distribution on the labels may not be always available. Example implementations leverage a two-step technique where first an approximate histogram of the labels can be built and used as a prior for the optimization algorithm in the second step. Advantageously, as the number of samples grows, this two-step algorithm can yield an expected loss (between the privatized label and the raw label) arbitrarily close to an expected loss of an optimal local differential privacy mechanism. Such example two-step algorithms can be naturally deployed in the two-party learning setting where each example is vertically partitioned with one party holding the features and the other party holding the (sensitive) labels. The algorithm can be entirely one-way, with a single message communicated from the labels party to the features party. This one-way communication can satisfy label differential privacy. This setting can be referred to as feature-oblivious label differential privacy.

Example aspects of the present disclosure can provide a number of technical effects and benefits. Example implementations can provide for improved training of machine-learned models with improved data privacy. Training machine-learned models can be data-intensive, especially to obtain desired levels of accuracy, precision, and other performance metrics. Some models are configured to operate on data that might contain sensitive information. Traditional techniques for obscuring such information can also degrade the efficacy of the training data for training the models. For instance, if a model in training fails to agree with a training label that has been noised, the differences could be based on an error of the model or an error of the label itself due to the noise. In this manner, for instance, naively generated noised training data can lead to poor model performance. In contrast, example implementations of the present disclosure can advantageously generate noised label data that better aligns with the underlying raw label data, thereby decreasing noise-induced error. In this manner, for instance, example implementations of the present disclosure can better achieve the twin aims of good model performance and data privacy.

Example implementations can provide for more efficient private communications of training data for differentially private training of machine-learned models. For instance, example systems can advantageously implement feature-oblivious label differential privacy such that communication of the noised label can be performed in an open loop or one-way manner. This can allow for improved parallelization across devices and systems, decreased network or communication bus traffic, fewer points of vulnerability to attack, fewer stages of noising, etc. This can provide for improved system and device reliability, security, resource usage (e.g., energy usage, processor usage, memory usage, network bandwidth usage, etc.) and the like. In this manner, for instance, example implementations of the present disclosure can more efficiently achieve the twin aims of good model performance and data privacy.

Example aspects of the present disclosure are discussed herein in reference to the enclosed figures.

FIG. 1 is a block diagram of an example system for generated training labels with label differential privacy according to some implementations according to the present disclosure. A label source 102 can generate initial label data 104. Feature source 106 can output feature data 108 associated with initial label data 104. Initial label data 104 can pass to label noising model 110. Label noising model 110 can obtain an initial label 112 from the initial label data 104. A binning model 114 can process initial label 112. Binning model 114 can be configured to map input initial label values to noised label values: for instance, within a bin of input label values, multiple values 114-1 and 114-2 can be mapped to the same representative noised value 114-3. Other ranges of input label values can be associated with other representative noised values, such as noised value 114-4 and noised value 114-5. The representative noised values (e.g., 114-3, 114-4, 114-5) can be randomly sampled by sampling mechanism 115 according to a privacy parameter configuration 116 (e.g., sampled based on probability distribution shaped by a differential privacy parameter) to return a noised label 118. Label noising model 110 can output noised label data 120. A model trainer 140 can receive the output(s) and compile training data 142 based on noised label data 120 and feature data 108. Model trainer 140 can use training data 142 to train machine-learned model(s) 144.

Label source 102 can be or include substantially any source of data labels. Data labels can include alphanumerical labels or other values. Labels can correspond to characteristics of an event or object. Labels can include quantified characteristics, such as a count, a quality, a measure, or other value.

Label source 102 can be implemented on a computing device. Label source 102 can be implemented on a local user device or on a server device interacting with a local user device. Label source 102 can associate labels with a user account or session identifier, such as a user account or session identifier associated with a particular user session.

For instance, label source 102 can generate labels describing events including tasks performed by or for a computing device. The tasks can include receiving content served to a user device responsive to a request from the user device. The tasks can include actions performed by the user device in association with the content (e.g., executing code served with the content, such as executing a hyperlink served with the content, responsive to rendering the content). The tasks can include generation of data records in association with serving the content, such as generating a record of a transaction performed in association with rendering of the content. In general, label source 102 can generate labels that model results of a process, internal states or outputs of a system, or other values. In such a model framework, labels can be considered dependent variables.

Initial label data 104 can include labels generated by label source 102. Initial label data 104 can include data packets containing one or more labels. Initial label data 104 can be streamed or communicated in batches. Sets of initial label data 104 can be associated with different types, categories, or other identifiers. For instance, some initial label data can be associated with a first user session or a first event and other initial label data can be associated with a second user session or a second event.

Feature source 106 can be or include substantially any source of data features. Data features can include any type of data. Features can correspond to characteristics of an event or object. Features can include quantified characteristics, such as a count, a quality, a measure, or other value. Features can include categorical measures.

Feature source 106 can be implemented on a computing device. Feature source 106 can be implemented on a local user device or on a server device interacting with a local user device. Feature source 106 can associate features with a user account or session identifier, such as a user account or session identifier associated with a particular user session.

For instance, feature source 106 can generate features describing events including tasks performed by or for a computing device. The tasks can include serving content to a user device responsive to a request from the user device. Feature source 106 can generate features describing user sessions during which the task(s) were performed. Feature source 106 can record context data providing context for the user session(s), including session activity, timing, device characteristic(s), other content provided to the device(s), prior histories of other session(s), etc. In general, feature source 106 can generate features that model inputs to a process, inputs to a system, or other values. In such a model framework, features can be considered independent variables.

Feature data 108 can include features generated by feature source 106. Feature data 108 can include data packets containing one or more features. Feature data 108 can be streamed or communicated in batches. Sets of feature data 108 can be associated with different types, categories, or other identifiers. For instance, some feature data can be associated with a first user session or a first event and other feature data can be associated with a second user session or a second event.

The label source 102 and the feature source 106 can be implemented on different devices, different systems, or otherwise structured such that communication of the label data is desired to be privatized with respect to the feature source 106. For instance, feature source 106 can be associated with a computing system that implements one or more machine-learned models (e.g., models 144) for processing features to predict labels. It may be desired to train the model(s) associated with the feature source 106 to better predict labels without leaking any private information contained in the label data. Advantageously, example implementations according to the present disclosure can provide for differentially-private communication of the label data for training the model(s).

Label noising model 110 can receive initial label data 104. For a given initial label 112, label noising model 110 can obtain a noised label 118. Label noising model 110 can probabilistically generate the noised label 118. Label noising model 110 can implement a randomized response over label bins associated with the initial label data 104.

Binning model 114 can map the initial label data 104 to label bins. Each bin can be associated with a representative value for the range of the initial label data 104 covered by the bin. For instance, within a bin of input label values, multiple label values 114-1 and 114-2 can be mapped to the same representative noised value 114-3. Other ranges of input label values can be associated with other representative noised values, such as noised value 114-4 and noised value 114-5.

Label noising model 110 can generate a noised label 118 corresponding to the initial label 112 by returning a randomized response on the representative label bin values. For instance, label noising model 110 can use a random sampling mechanism 115 to sample a representative value from the set of representative values according to a probability distribution over the plurality of label bins. The probability distribution can be characterized by a first probability for returning a representative value of a label bin to which the initial label 112 is assigned. The probability distribution can be characterized by a second probability for returning another representative value. Optionally the probability distribution can be characterized by a third probability when there is no assigned bin. For instance, if there is no assigned label bin, the third probability can be evenly distributed among all the bins.

As used herein, the terminology of probability and probability distributions can refer to actual probabilities, estimated probabilities, or proxies for actual probabilities or estimated probabilities, such as scores or weights. Probability values and probability distributions can be analytically computed. Probability values and probability distributions can be numerically estimated. Probability values and probability distributions can be generated by machine-learned models (e.g., provided in an output layer of a machine-learned model). Probability values and probability distributions can be explicit or implicit. Probability values and probability distributions can be explicitly represented or implicitly encoded in, for instance, machine-learned model parameters or hidden or latent states of a machine-learned model.

Privacy parameter configuration 116 can shape the probability distribution used for sampling. For instance, the first probability for returning a representative value of a label bin to which the initial label 112 is assigned can be related to a privacy parameter. For example, a small privacy parameter (e.g., a high privacy demand) can cause the probability distribution to associate with greater likelihood a random response over an unrelated bin, further obscuring the value of the initial label 112. A larger privacy parameter can thus cause the probability distribution to associate with less likelihood a random response over an unrelated bin, allowing the noised label 118 to provide a better training signal for downstream training of model(s) 144 using noised label data 120.

Noised label data 120 can include labels generated by label noising model 110. Noised label data 120 can include data packets containing one or more noised labels 118. Noised label data 120 can be streamed or communicated in batches. Sets of noised label data 120 can be associated with different types, categories, or other identifiers. For instance, some noised label data can be associated with a first user session or a first event and other noised label data can be associated with a second user session or a second event. Such associations can be stripped or otherwise omitted from noised label data 120. Noised label data 120 can include one or more index values for registering the noised label data 120 with feature data 108.

Model trainer 140 can train machine-learned model(s) 144 using training data 142. Training data 142 can include training examples based on pairings of one or more features of the feature data 108 and one or more labels of noised label data 120. Model trainer 140 can train machine-learned model(s) 144 using a variety of techniques, including techniques discussed below with reference to FIGS. 8A-8C. For instance, model trainer 140 can train machine-learned model(s) 144 to optimize a variety of loss functions. The loss functions can include regression loss functions, such as squared loss, absolute-value loss, Poisson log loss, and the like.

For instance, in an example supervised learning scenario, a goal of a training pipeline can be to learn a predictor $f_\theta$ (e.g., parameterized by $\theta$) based on a set of examples $(x,y) \in \mathcal{X} \times \mathcal{Y}$ drawn from a distribution $\mathcal{D}$. The parameters $\theta$ can be optimized based on an objective $\mathcal{L}(f_\theta)$. The objective can be an expected value of a loss l. For example, in one formulation, $\mathcal{L}(f_\theta) := \mathbb{E}_{(x,y) \sim D}[l(f_\theta, y)]$. Example losses include regression losses, such as a squared loss $l_{sq}(\tilde{y}, y) := \log(1 + e^{-\tilde{y}y})$, absolute value loss $l_{abs}(\tilde{y}, y) := |\tilde{y} - y|$, Poisson log loss $l_{Poi}(\tilde{y}, y) := \tilde{y} - y \cdot \log(\tilde{y})$, and the like.

Using this terminology, a label noising model 110 can generate a noised label $\hat{y} \in \hat{\mathcal{Y}}$, where $\hat{\mathcal{Y}}$ can be an output set of representative label values. Label noising model 110 can include a binning model 114 expressed as a mapping function $\Phi: \mathcal{Y} \to \hat{\mathcal{Y}}$ that maps initial label values to representative label values. In this manner, for instance, $\hat{\mathcal{Y}}$ can represent bins to which intervals of $\mathcal{Y}$ are assigned. Label noising model 110 can return a randomized response over $\hat{\mathcal{Y}}$. For instance, label noising model can randomly sample $\hat{y} \sim \hat{Y}$, where $\hat{Y}$ can be a random variable distributed as follows, for all $\hat{y}$:

$$Pr[\hat{Y} = \hat{y}] = \begin{cases} p_=, & \text{for } \hat{y} = \Phi(y) \\ p_{\neq}, & \text{for } \hat{y} \neq \Phi(y) \end{cases} \tag{1}$$

The first probability $p_=$ and the second probability $p_{\neq}$ can be parametrized by a privacy parameter (e.g., a parameter $\varepsilon$, such as for $\varepsilon$-differential privacy). The first probability $p_=$ and the second probability $p_{\neq}$ can be parametrized by a size of the output set of representative label values $\hat{\mathcal{Y}}$ (e.g., $|\hat{\mathcal{Y}}|$).

The first probability $p_=$ can be correlated to the privacy parameter (e.g., increase with an increase in the parameter). For instance, as a privacy parameter increases, the probability of label noising model 110 returning the assigned representative label value can increase (e.g., asymptotically to 1). As a privacy parameter decreases, any correlation between the input value and the output assigned value can diminish and eventually be obscured in random noise (e.g., the probability of label noising model 110 returning the assigned representative value can asymptotically approach an equal likelihood with all other representative values). The second probability $p_{\neq}$ can be determined based on $p_=$ (e.g., by dividing a remaining probability).

In an example, $p_=$ can be expressed as $$p_= = \frac{e^{\varepsilon}}{|\hat{\mathcal{Y}}| + (e^{\varepsilon} - 1)} \tag{2}$$

and $$p_{\neq} = \frac{1}{|\hat{\mathcal{Y}}| + (e^{\varepsilon} - 1)}. \tag{3}$$

Label noising model 110 can be optimized for improved performance. Improved performance can include improved accuracy of the trained model within a given privacy parameter. For instance, a total prediction error for the model(s) 144 can be based on a prediction error component and a noise-based component. A prediction error component can evaluate how well a model prediction agrees with a training output value such as $l(f_{\theta}(x), \hat{y})$ when the model is trained over features and noised labels $(\mathcal{X}, \hat{\mathcal{Y}})$. A noise-based error component can evaluate an error amount introduced by noising the initial label data, such as $l(\hat{y}, y)$.

While the noising performed by the label noising model 110 can be designed to obscure the actual value of any given label value, at a population level the label noising model 110 can be optimized to better approximate the data in the initial label data. By better approximating the data in the initial label data, the label noising model 110 can generate noised label data 120 that can better serve as training data for training machine-learned models. Thus label noising model 110 can be configured to reduce an expected value of a noise-based loss component, such as $\mathbb{E}_{y \sim P; \hat{y} \sim \mathcal{M}(y)}[l(\hat{y}, y)]$, where $P$ is a probability distribution associated with the initial label data (e.g., indicating how likely a particular initial label—and its corresponding error—is to occur), and $\mathcal{M}(y)$ indicates the label noising model 110.

Figure 2:
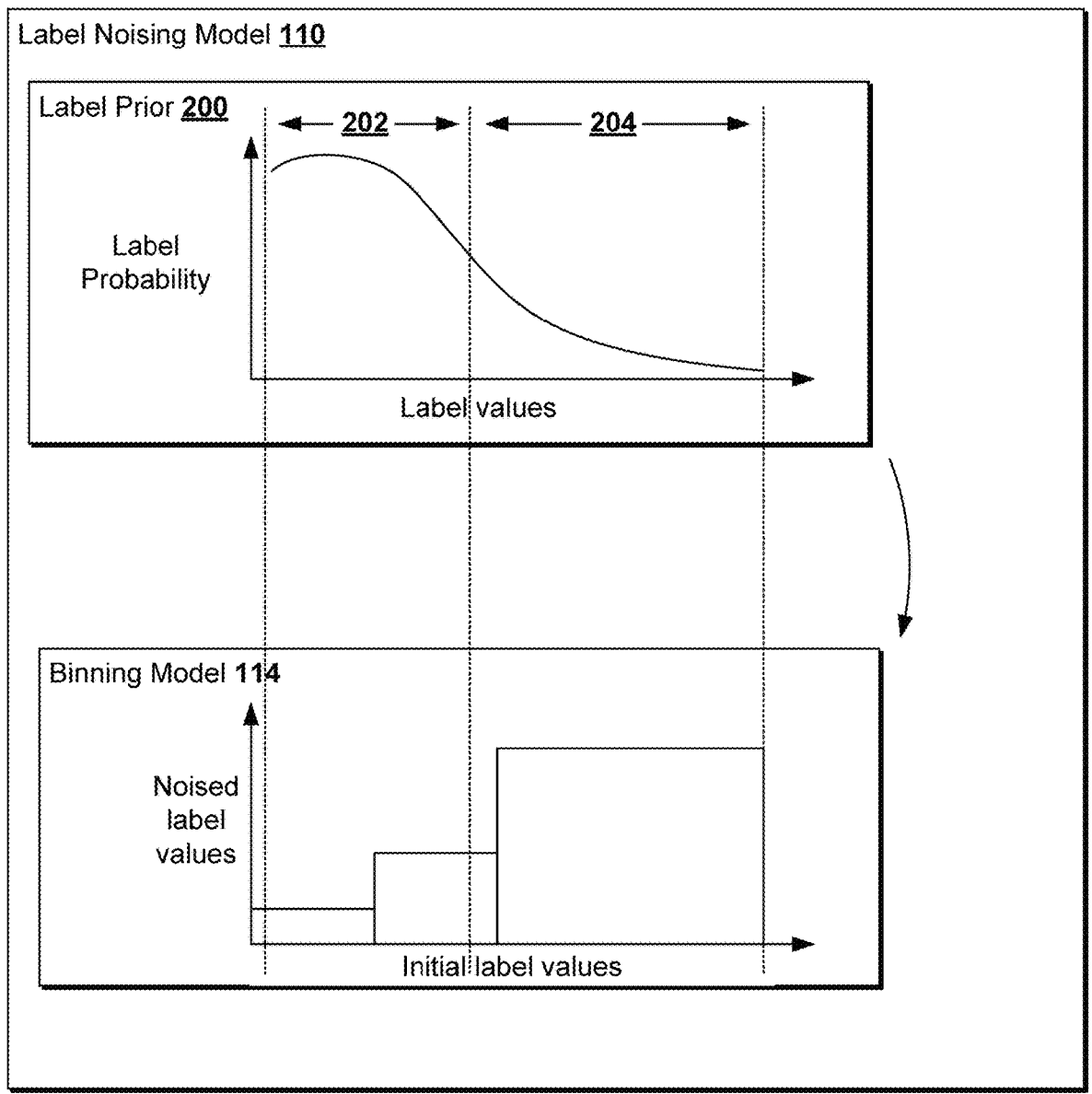
FIG. 2 is a block diagram of an example configuration of a label noising model according to example aspects of some embodiments of the present disclosure.

FIG. 2 is a block diagram of an example configuration of a label noising model 110. A label prior 200 can be used to construct or refine the mapping of binning model 114. The label prior 200 can include probabilities associated with label value(s). This probability data can inform the construction of the bins used by the binning model 114. For instance, intervals of the domain having higher probability, such as interval 202, can be more finely represented by the bins of the binning model 114 as compared to intervals of the domain having lower probability, such as interval 204.

In this manner, for instance, an expected value for the error introduced by the binning of the label values (e.g., a noised-based loss component) can be decreased by allocating greater accuracy to the more probable labels. In this manner, for instance, label noising model 110 and binning model 114 can be optimized for a given privacy parameter.

Label prior 200 can be actual or estimated. Label prior 200 can be obtained from a historical record of label data. Label prior 200 can be obtained by truncating a historical record to focus on recent data (e.g., omitting label data falling outside a target time period, such as the preceding K days).

Label noising model 110 can be optimized by optimizing binning model 114. Binning model 114 can be optimized based on an expected value of a noise-based loss component. Binning model 114 can be broken down into two aspects for configuration: (i) the representative values assigned to the respective bins and (ii) the intervals of the initial label data that is assigned to the bins. The second aspect can be optimized in view of the first.

The representative values can be optimized by weighting a loss associated with a candidate representative value by a probability associated with a corresponding initial label value. The probability associated with the corresponding initial label value can be further scaled based on the privacy parameter.

The intervals can be optimized by evaluating various interval configurations. This can be implemented as a linear program. For instance, a linear program can maintain an internal state based on one or more objectives. The linear program can maintain an internal state of the univariate optimization of the representative value, and the linear program can use the internal state of the univariate optimization to determine the internal state for the intervals.

An example algorithm for the linear program is provided in pseudocode:

Input: Distribution P over $\mathcal{Y} \subseteq \mathbb{R}$; a privacy parameter $\varepsilon \geq 0$; a loss function $l : \mathbb{R}^2 \leftarrow \mathbb{R}_{\geq 0}$; k elements of $\mathcal{Y}$ as $\{y^1, y^2, \ldots, y^k\}$,
optionally in increasing order; and a state variable A initialized as A[i][j] for all i, j $\in$ {0, . . . , k} (e.g., initialized to $\infty$) except that A[0][0] $\leftarrow$ 0.
For r, i $\in$ {1, . . . , k} do $$L[r][i] \leftarrow \min_{\hat{y} \in \mathbb{R}} \left[ \sum_{y \in \mathcal{Y}} p_y \cdot l(\hat{y}, y) \cdot {}_{p_\varepsilon[y \in [y^r, y^i]]_\varepsilon} \right] \tag{4}$$

For i $\in$ {1, . . . , k} do
    For j $\in$ {1, . . . , i} do $$A[i][j] \leftarrow \min_{0 \leq r < i}[A[r][j-1] + L[r+1][i]] \tag{5}$$

Return: $\Phi$ and $\hat{\mathcal{Y}}$ corresponding to $$\min_{d \in [k]} \left[ \frac{A[k][d]}{d + (e^{\varepsilon} - 1)} \right]. \tag{6}$$

For example, $\Phi$ and $\hat{\mathcal{Y}}$ corresponding to Equation 6 can be computed efficiently by recording a optimized value for each A[i][j] and L[r][i] (e.g., a local minimizer, a global minimizer, etc.), and going backward starting from i=k and $$j = \operatorname*{argmin}_{d \in [k]} \left[ \frac{A[k][d]}{d + (e^\varepsilon - 1)} \right]. \tag{7}$$

Example optimization techniques for optimizing binning model 114 can provide for efficient optimization. For instance, a loss function l can be convex, such that optimization of $\hat{y}$ can be convex and efficiently computed. Operating time can vary based on the loss function used. For instance, for squared loss, absolute value loss, and Poisson log loss, the univariate optimization of $\hat{y}$ can be computed in amortized $\mathcal{O}(1)$ time, such that the optimization as a whole can be performed in a total running time of $\mathcal{O}(k^2)$.

For example, for a squared loss or a Poisson log loss, an expression for a solution to Equation 4 can be $$\hat{y}_{r,i}^* = \frac{\sum_{y \in \mathcal{Y}} p_y \cdot {}_\rho \mathbb{1}[y \in [y^r, y^i]] \cdot \varepsilon \cdot y}{\sum_{y \in \mathcal{Y}} p_y \cdot {}_\rho \mathbb{1}[y \in [y^r, y^i]] \cdot \varepsilon} \tag{8}$$

For example, for an absolute value loss, an expression for a solution to Equation 4 can be determined in view of a weighted median wmed$\{(w_1, a_1), \ldots, (w_t, a_t)\}$ where $\{(w_1, a_1), \ldots, (w_t, a_t)\}$ is a set of t tuples such that $w_1, \ldots, w_t \in \mathbb{R}_{\geq 0}$ and $a_1, \ldots, a_t \in \mathbb{R}$ with a numbered in ascending order. The weighted median wmed$\{(w_1, a_1), \ldots, (w_t, a_t)\}$ can be the minimum value a* satisfying $$\sum_{j \in [t]; a_j \leq a^*} w_j \geq \frac{1}{2} \sum_{j \in [t]} w_j. \tag{9}$$

This leads to $$\hat{y}_{r,i}^* = wmed \left\{ \{(p_y \cdot {}_\rho \mathbb{1}[y \in [y^r, y^i]] \cdot \varepsilon, y)\}_{y \in \mathcal{Y}} \right\}. \tag{10}$$

The representative values can optionally be constrained to be selected from the members of the initial label data. If $\hat{y}_{r,i}^*$ is constrained to be an element of $\mathcal{Y}$ the following can be performed. For a fixed r, varying i, a value $\hat{y}_{r,r}^*$ can first be computed along with $$w_{low} = \sum_{y \in \mathcal{Y}; y \leq \hat{y}_{r,r}^*} p_y \cdot {}_\rho \mathbb{1}[y \in [y^r, y^i]] \cdot \varepsilon \tag{11}$$

and $$w_{high} = \sum_{y \in \mathcal{Y}; y > \hat{y}_{r,r}^*} p_y \cdot {}_\rho \mathbb{1}[y \in [y^r, y^i]] \cdot \varepsilon. \tag{12}$$

For i=r+1, ..., k, initialize $\hat{y}_{r,i}^* = \hat{y}_{r,i-1}^*$ and update $w_{low}$ or $w_{high}$ (e.g., corresponding to the weight change from $p_{y_i}$ to $e^\varepsilon p_{y_i}$ of $y_i$). Updates can be performed to reach the correct value of $\hat{y}_{r,i}^*$; for instance, if $w_{low} < w_{high}$, then move to the next large value in $\mathcal{Y}$; if $w_{low} - p_{\hat{y}_{r,i}^*} \cdot e^{\mathbb{1}[y \in [y^r, y^i]] \cdot \varepsilon} \geq w_{high}$, then move to the next smaller value in $\mathcal{Y}$. Otherwise, stop and return the current value of $\hat{y}_{r,i}^*$.

Multiple priors can be used for noising label data. Priors can correspond to categories of labels. Labels can be categorized by association to particular entities (e.g., labels for activity with respect to particular shopping platforms, publication platforms, publication modalities, etc.). For each category a prior can be obtained for noising the label data from that category based on the prior distribution for that category.

In some scenarios, an actual prior distribution data may be unknown. To optimize binning model 114, one or more prior distributions can be privately estimated. The prior can be estimated within a given total privacy parameter.

Figure 3:
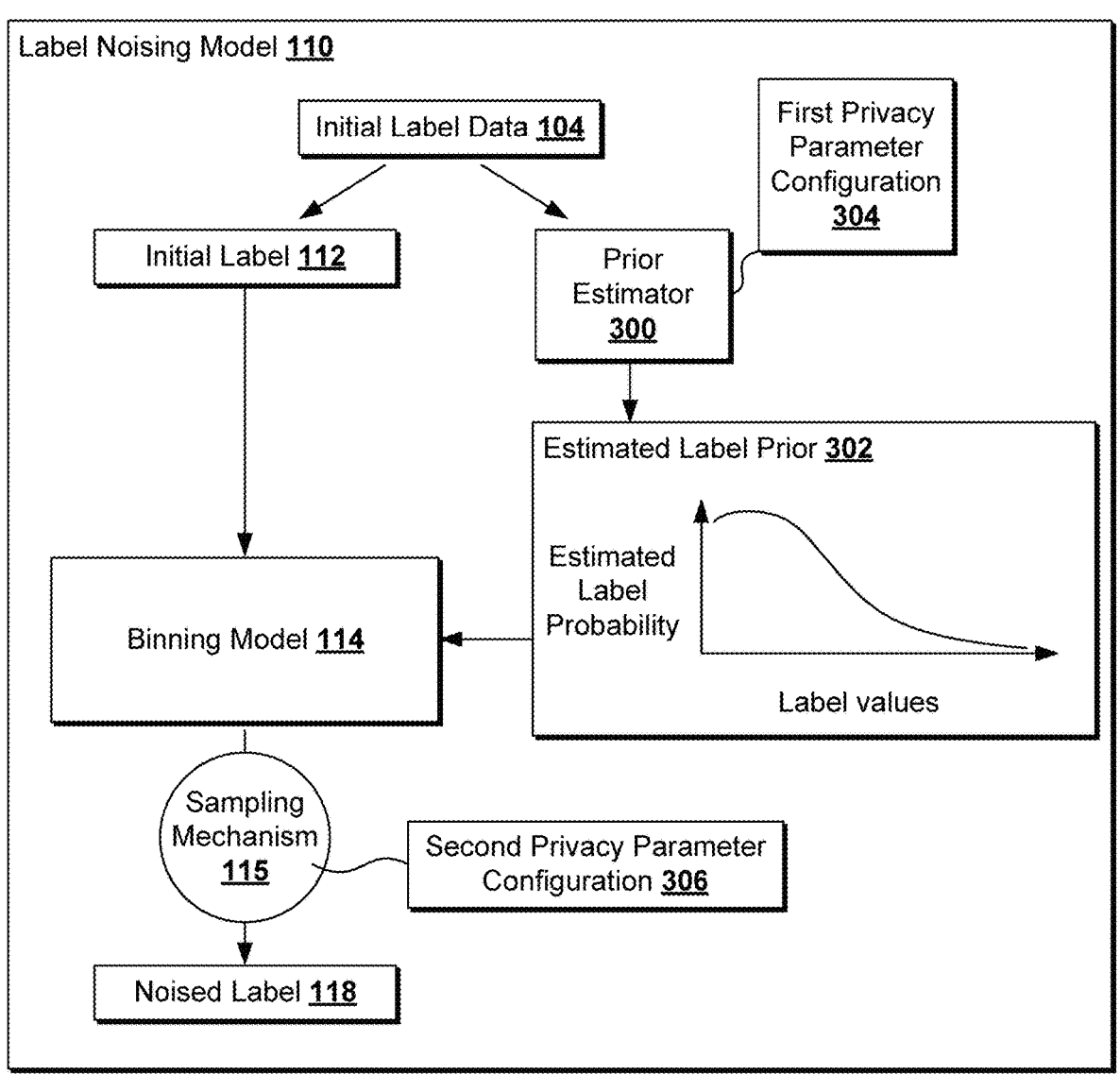
FIG. 3 is a block diagram of an example configuration of a label noising model according to example aspects of some embodiments of the present disclosure.

FIG. 3 is a block diagram of an example configuration of a label noising model 110. Initial label data 104 can be passed to a prior estimator 300 that generates an estimated label prior 302 according to a first privacy parameter configuration 304. The estimated label prior 302 can be used to configure binning model 114 (e.g., similar to how label prior 200 can be used). Label noising model 110 can thus sample binning model 114 using a second privacy parameter configuration 306 to obtain noised label 118. In this manner, for instance, a total privacy parameter can be distributed across first privacy parameter configuration 304 and second privacy parameter configuration 306.

Prior estimator 300 can estimate a prior distribution 302 locally over initial label data 104. For instance, prior estimator 300 can estimate a prior distribution 302 from which initial label data 104 could be randomly sampled. Prior estimator 300 can estimate a prior distribution 302 over logged data associated with the label source, such as previous label data, previous noised label data, recorded history of interactions, etc. Prior estimator 300 can generate or predict the prior distribution 302 with a machine-learned model trained to predict a probability distribution from one or more characteristics associated with the label source. For instance, the label source can be associated with a user account, and the user account can be associated with data records indicating activity history (e.g., a history of label data, indications of preferences, personalization data, etc.). The activity history can be used to generate or predict a prior distribution 302 based on local characteristics for that user account. For instance, where the label data corresponds to interactions with a particular server system, local characteristics can include account-specific measures of all interactions with the server system (e.g., amount of data downloaded from server system, length of browsing session on web pages associated with the server system, quantity of repeat visits to web pages associated with the server system, quantity of items requested from an entity associated with the server system, etc.).

Prior estimator 300 can estimate a prior distribution 302 globally over a population or sample thereof. For instance, prior estimator 300 can receive initial label data from multiple label sources, or multiple distinct sets of initial label data from a common source (e.g., receiving from a server sets of label data that correspond to sets of user accounts). Prior estimator 300 can compute a global probability distribution 302 over an aggregate set of initial label data. Prior estimator 300 can use a machine-learned model to predict the global probability distribution 302 based on various global characteristics. For instance, global characteristics can include population activity. For instance, where the label data corresponds to interactions with a particular server system, global characteristics can include population-level measures of all interactions with the server system (e.g., amount of data downloaded from server system, length of browsing session on web pages associated with the server system, quantity of repeat visits to web pages associated with the server system, quantity of items requested from an entity associated with the server system, etc.).

Prior estimator 300 can generate an estimated prior 302 based on any suitable technique. For instance, estimated prior 302 can be determined based on clustering, data slicing, or other approaches. Prior estimator 300 can be generated iteratively over time, updating estimated prior 302 as new data becomes available.

Prior estimator 300 can implement a Laplace mechanism for generating prior distribution 302. The Laplace mechanism can be differentially private, such as ε-differentially private. Prior estimator can be differentially private within a first privacy parameter $\varepsilon_1$. Label noising model 110 can sample binning model 114 that is configured according to a second privacy parameter $\varepsilon_2$. In this manner, for instance, label noising model 110 can be $(\varepsilon_1+\varepsilon_2)$—differentially private.

An example mechanism can proceed as follows: given n samples drawn from some assumed prior P, construct a histogram over $\mathcal{Y}$ and inject Laplace noise (the magnitude being inversely correlated to ε) to each entry. Entries can be clipped to eliminate negative values. Entries can be normalized. The output can be an estimated distribution P' over $\mathcal{Y}$.

---

An example algorithm for estimation is provided in pseudocode:
Input: Privacy parameter $\varepsilon \geq 0$; labels $y_1, \ldots, y_n \in \mathcal{Y}$
For $y \in \mathcal{Y}$ do
    $h_y \leftarrow$ count of i such that $y_i = y$
    $h'_y \leftarrow \max\{h_y + \text{Lap}[2/\varepsilon]\}$
Return: Distribution P' over $\mathcal{Y}$ such that $$p'_y = \frac{h'_y}{\sum_{y \in \mathcal{Y}} h'_y} \quad (13)$$

---

Figure 4:
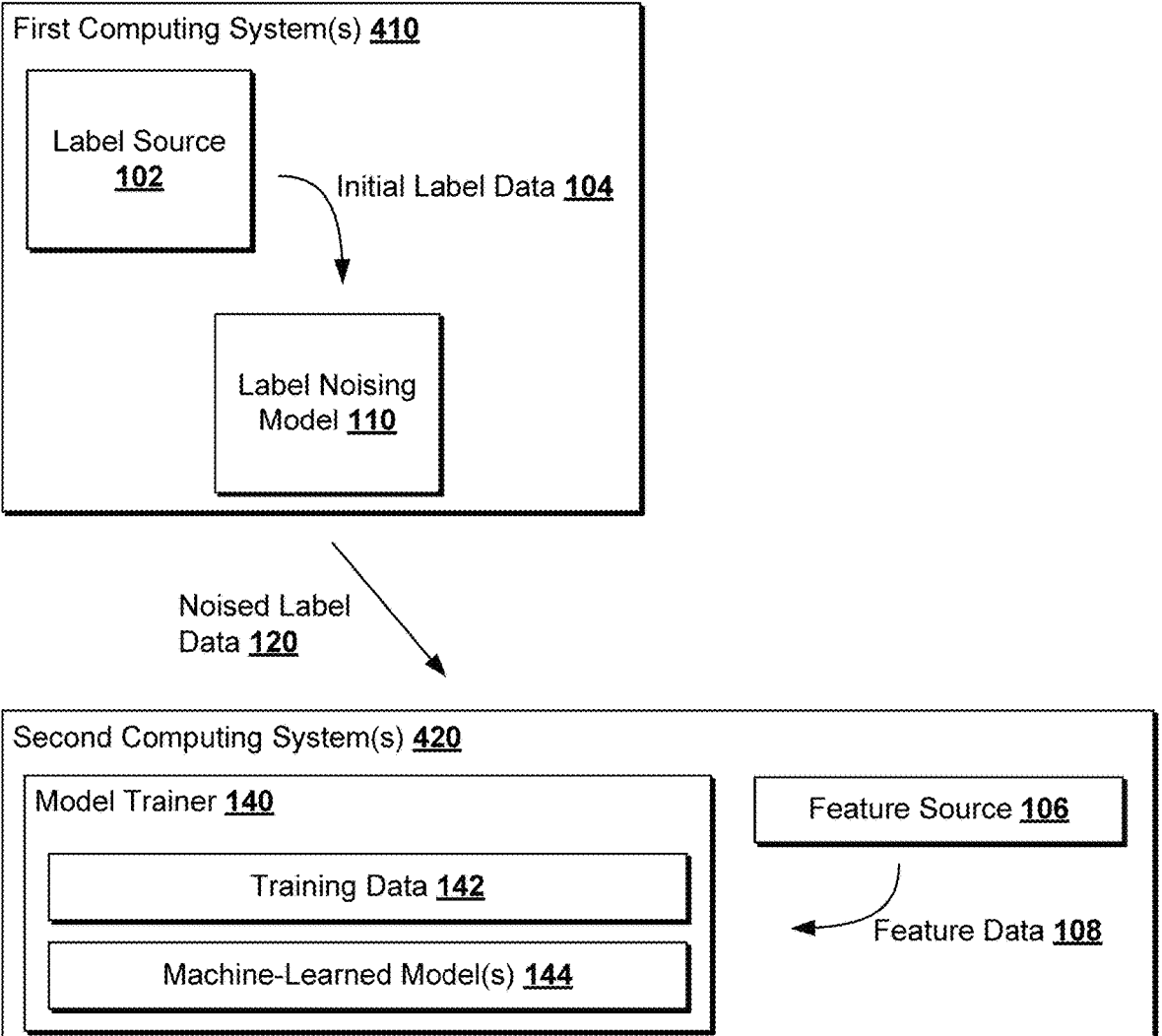
FIG. 4 is a block diagram of an example computing ecosystem for generating training datasets according to example aspects of some embodiments of the present disclosure.

FIG. 4 is a block diagram of an example computing ecosystem implementing example techniques according to aspects of the present disclosure. First computing system(s) 410 can include label source 102 and label noising model 110. Noised label data 120 generated by first computing system(s) 410 can pass to second computing system(s) 420. Second computing system(s) 420, which can include one or more systems that can be associated together or operated independently, can include feature source 106 and model trainer 140.

First computing system 410 can be a user computing system. First computing system 410 can be a server computing system. First computing system 410 can include one or more computing devices, including multiple devices associated with the same entity (e.g., a service provider) or the same user account (e.g., a user account registered with a service provider).

Label source 102 can include executable programs executing on first computing system(s) 410. Label source 102 can include compiled or logged data stored on first computing system 410 (e.g., optionally received from elsewhere).

For instance, label source 102 can be implemented in a browser on a user device. A user device can log actions performed or other events on or otherwise associated with the user device. The user device can receive indication of such events from a remote server with which the user device is interacting (e.g., communication packages describing label data). An application operating on the user device (e.g., a browser, a system service, etc.) can compile logged data on the device and generate initial label data 104. Label noising model 110 can operate with a prior determined on-device. Label noising model 110 can operate with a prior determined on a remote device, such as a cloud computing server. For instance, a prior can be determined and downloaded to the user device. Using this prior, label noising model can optimize a binning model 114 for generating the noised label data 120.

Label source 102 can be implemented on a server system. For instance, a server system can be associated with a service provider that maintains records of events performed on its systems or are reported to its systems by other systems. For instance, the server system can be associated with a data analytics service that collects and processes event data from a plurality of client systems.

Second computing system(s) 420 can receive noised label data 120, combine it with feature data 108 from feature source 106 into training data 142, and train machine-learned model(s) 144 using model trainer 140. Second computing system(s) 420 can include feature source 106. Model trainer 140 can be implemented on a first set of devices and feature source 106 can be implemented on a second set of devices. In some situations the second set of devices can be implemented independently of (e.g., separate from, by a separate entity, etc.) the first set of devices.

Figure 5:
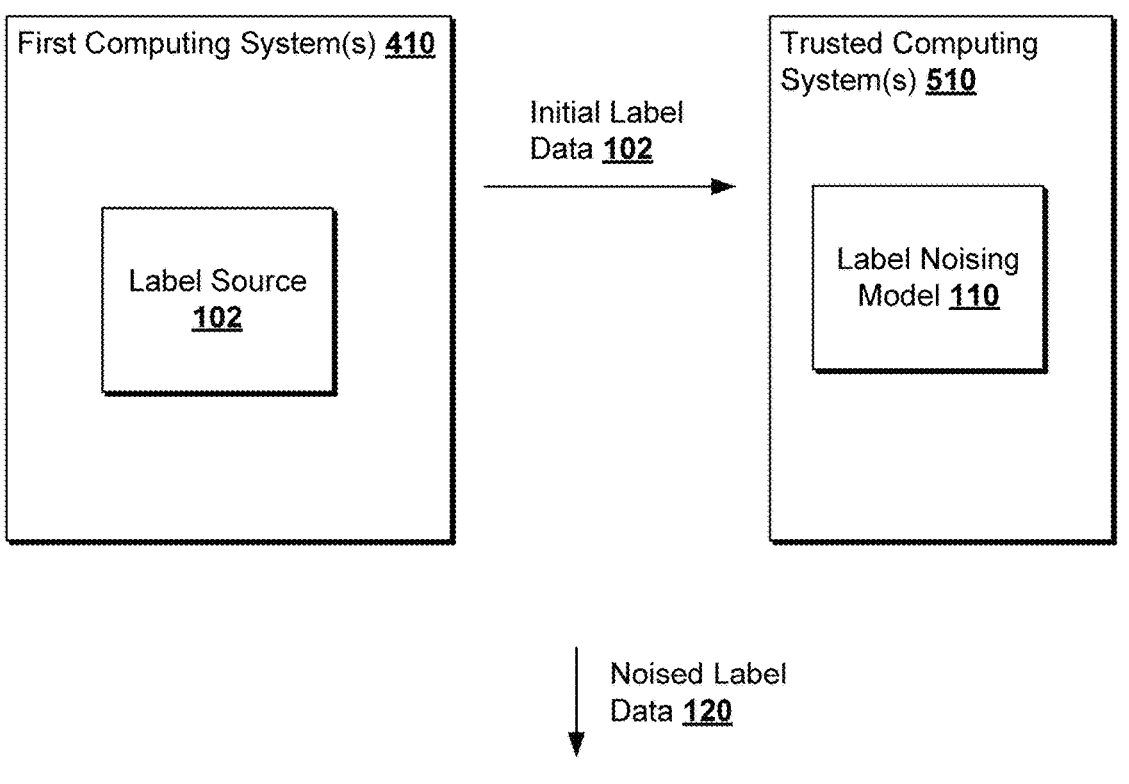
FIG. 5 is a block diagram of an example computing ecosystem for generating training datasets according to example aspects of some embodiments of the present disclosure.
Figure 5:
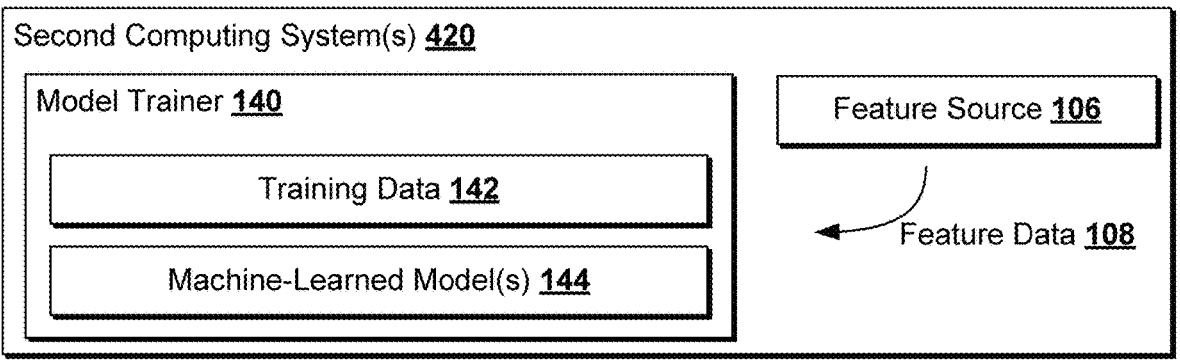

FIG. 5 is a block diagram of an example computing ecosystem implementing example techniques according to aspects of the present disclosure. First computing system(s) 410 can interact with trusted computing system(s) 510 to generate noised label data 120. Noised label data 120 can then be passed (e.g., from first computing system(s) 410, from trusted computing system(s) 510, etc.) to second computing system(s) 420.

Trusted computing system(s) 510 can implement label noising model 110 in view of actual or generated prior data (e.g., a label prior 200 or estimated label prior 302). Trusted computing system(s) 510 can implement label noising model 110 in view of global prior information. Trusted computing system(s) 510 can provide a trusted execution environment in which initial label data can be processed to determine an estimated prior (e.g., a local prior, such as a prior distinct to a particular device or user account; or a global prior, such as a prior computed over a sampled population of devices or user accounts).

Trusted computing system(s) 510 can interact with first computing system(s) 410 over a network connection. Trusted computing system(s) 510 can interact with first computing system(s) 410 through an application programming interface (API). The API can provide a portal for applications and services executing on first computing system(s) 410 to upload initial label data, receive noised label data, receive generated priors, etc.

Noised label data 120 can be communicated to second computing system(s) 420 from the trusted computing system(s) 510. For instance, the entire label noising pipeline can be implemented on trusted computing system(s) 510, and trusted computing system(s) 510 can pass noised label data 120 along for training model(s) 144. One or more portions of the label noising pipeline can be implemented on first computing system(s) 410. For instance, a prior can be generated on trusted computing system(s) 510 and the label data can be noised on first computing system(s) 410. A prior can be generated on trusted computing system(s) 510, the label data can be noised on trusted computing system(s) 510, and the noised label data can be returned to first computing system(s) 410. First computing system(s) 410 can pass noised label data to second computing system(s) 420 (e.g., so first computing system(s) 410 can manage the relationship with second computing system(s) 420 and trusted computing system(s) 510 can manage (e.g., need only manage) the relationship with first computing system(s) 410).

Figure 6A:
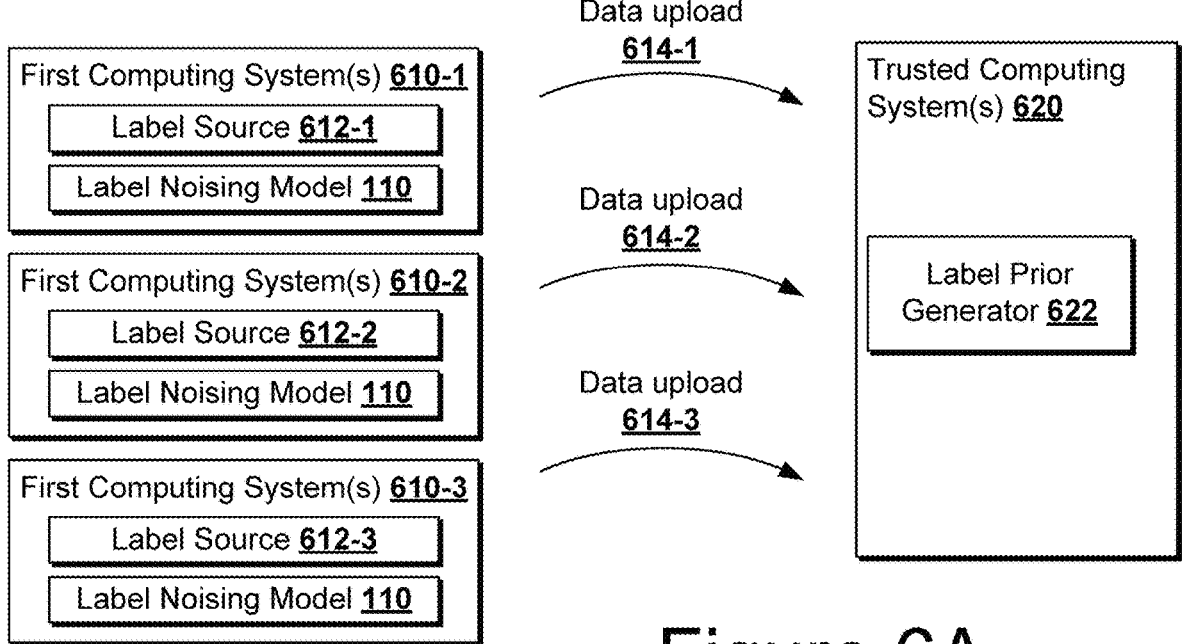
FIG. 6A is a block diagram of an example computing ecosystem for generating training datasets according to example aspects of some embodiments of the present disclosure.
Figure 6B:
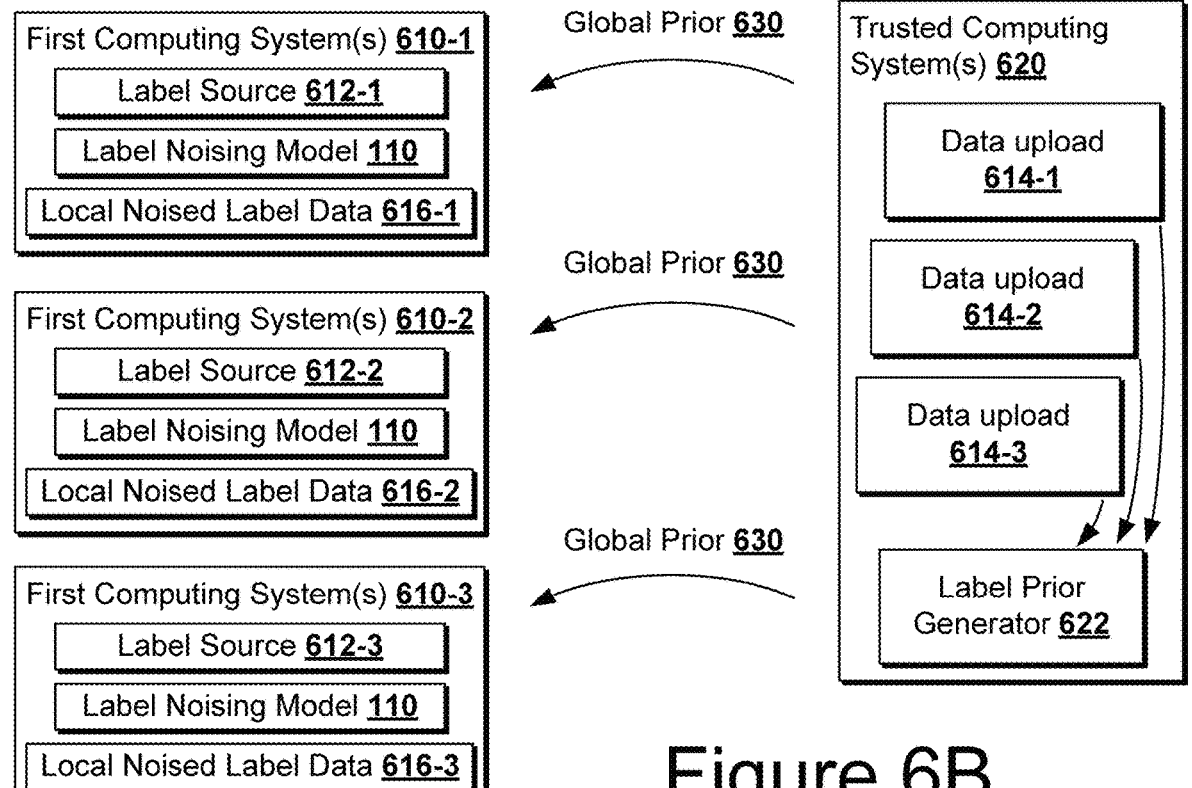
FIG. 6B is a block diagram of an example computing ecosystem for generating training datasets according to example aspects of some embodiments of the present disclosure.

A global prior can be computed over a set of multiple label sources. FIG. 6A and FIG. 6B are block diagrams of an example computing ecosystem implementing example techniques according to aspects of the present disclosure. First computing system(s) 610-1, 610-2, 610-3 can respectively pass data uploads 614-1, 614-2, 614-3 to trusted computing system(s) 620. Trusted computing system(s) 620 can input the received data to label prior generator 622 to generate a global prior 630 over the received data. Trusted computing system(s) 620 can distribute the global prior to the first computing system(s) 610-1, 610-2, 610-3. In this manner, for instance, the respective first computing system(s) 610-1, 610-2, 610-3 can locally compute local noised label data 616-1, 616-2, 616-3.

The data uploads 614-1, 614-2, 614-3 can include initial label data or noised label data. The trusted computing system(s) 620 can aggregate initial label data in a trusted environment. A global prior 630 can be generated. The global prior 630 can be actual or estimated (e.g., prior 200, estimated prior 302, etc.). The global prior can be associated with a category or type of label data. Trusted computing system(s) 620 can generate multiple priors based on the data uploads 614-1, 614-2, 614-3.

The trusted computing system(s) 620 can alternatively (or additionally) generate a prior distribution based on aggregate noised label data that was previously noised by first computing system(s) 610-1, 610-2, 610-3. The prior distribution over aggregate noised label data can then be returned to first computing system(s) 610-1, 610-2, 610-3 to improve a performance thereof.

Example Results

Example results obtained by an example implementation of the present disclosure are presented. Example configuration choices made for obtaining the example results are provided for illustration purposes only. For comparison against various baselines, the following will refer to the example implementation(s) of the present disclosure as "RR-on-bins."

The example results provided here compare RR-on-bins and the following baselines: the Laplace mechanism (Cynthia Dwork, Frank McSherry, Kobbi Nissim, and Adam D. Smith. Calibrating noise to sensitivity in private data analysis. In TCC, pp. 265-284, 2006b), the staircase mechanism (Quan Geng and Pramod Viswanath. The optimal mechanism in differential privacy. In ISIT, pp. 2371-2375, 2014) and the exponential mechanism (Frank McSherry and Kunal Talwar. Mechanism design via differential privacy. In FOCS, pp. 94-103, 2007). Note the Laplace mechanism and the staircase mechanism both have a discrete and a continuous variant. For real-valued labels (the Criteo Sponsored Search Conversion dataset), the continuous variant is used. For integer-valued labels (the US Census dataset and the App Ads Conversion Count dataset), the discrete variant is used.

The baselines and RR-on-bins are compared on three datasets. The first dataset is the Criteo Sponsored Search Conversion Log Dataset from Marcelo Tallis and Pranjul Yadav. Reacting to variations in product demand: An application for conversion rate (CR) prediction in sponsored search. In IEEE BigData, pp. 1856-1864, 2018. Each data point describes an action performed by a user (click on a product related advertisement), with additional information consisting of a conversion (product was bought) within a 30-day window and that could be attributed to the action. The present experiments formulate a label differential privacy problem to predict the revenue (in euros) obtained when a conversion takes place (the SalesAmountInEuro attribute). This dataset represents a sample of 90 days of Criteo live traffic data, with a total of 15,995,634 examples. Examples where no conversion happened are removed (SalesAmountInEuro is −1), resulting in a dataset of 1,732, 721 examples. The conversion value goes up to 62,458.773 euro. The conversion value is clipped to 400 euro, which corresponds to the 95th percentile of the value distribution.

The second dataset is the public 1940 US Census dataset. This dataset has been made available in bulk by the National Archives. This dataset has 131,903,909 rows. This experiment sets up a label differential privacy problem by learning to predict the duration for which the respondent worked during the previous year (the WKSWORK1 field, measured in number of weeks).

The third dataset is a private App Ads Conversion Count dataset from a commercial mobile app store. The examples in the App Ads Conversion Count dataset are ad clicks and each label counts post-click events (e.g., conversions) occurring in the app after a user installs it. For example, if a user installs a ride share app after clicking the corresponding ad, the label could be the total number of rides that the user purchases in a given time window after the installation.

Figure 7A:
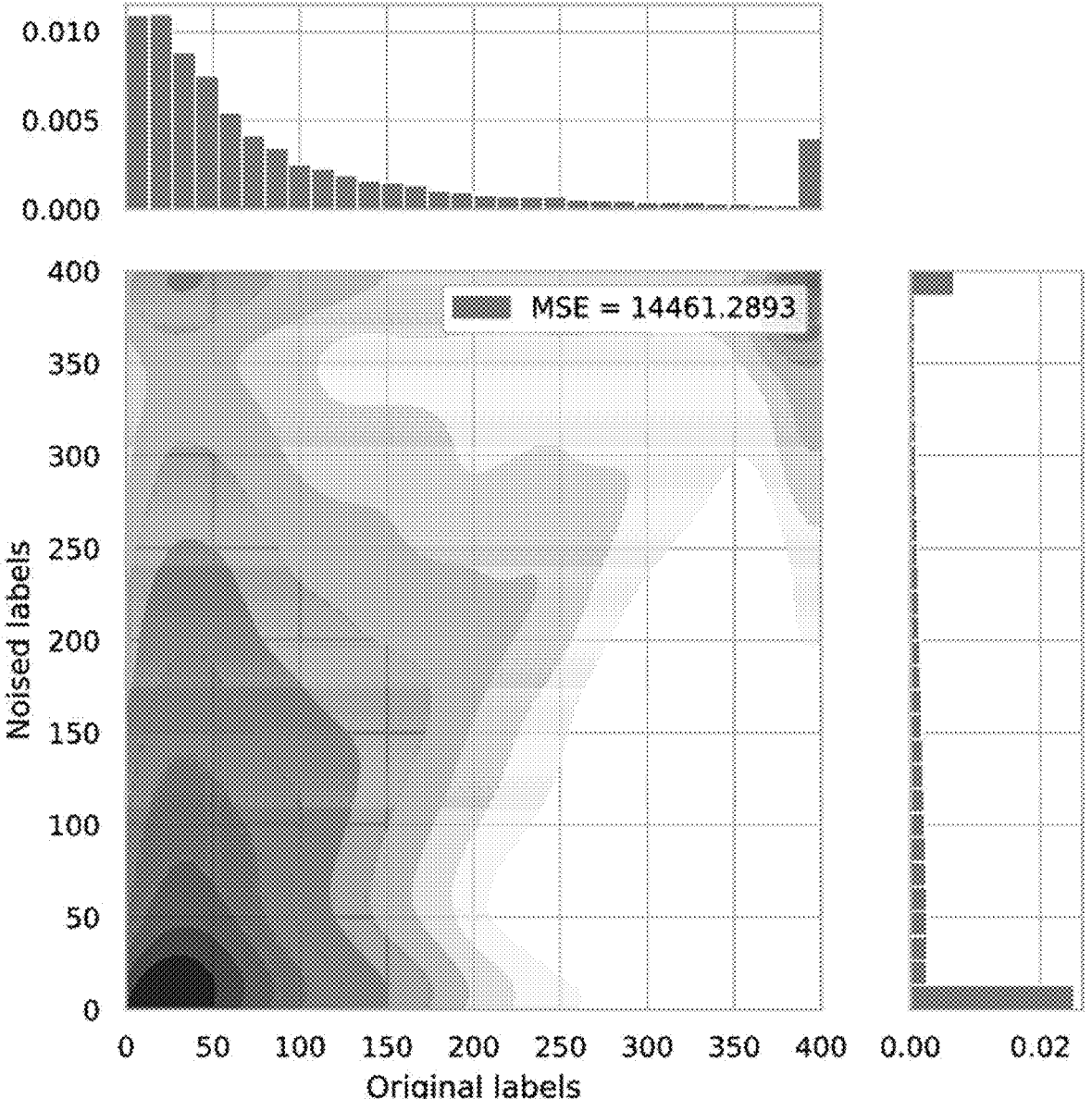
FIG. 7A provides a chart of example results of a baseline system.
Figure 7B:
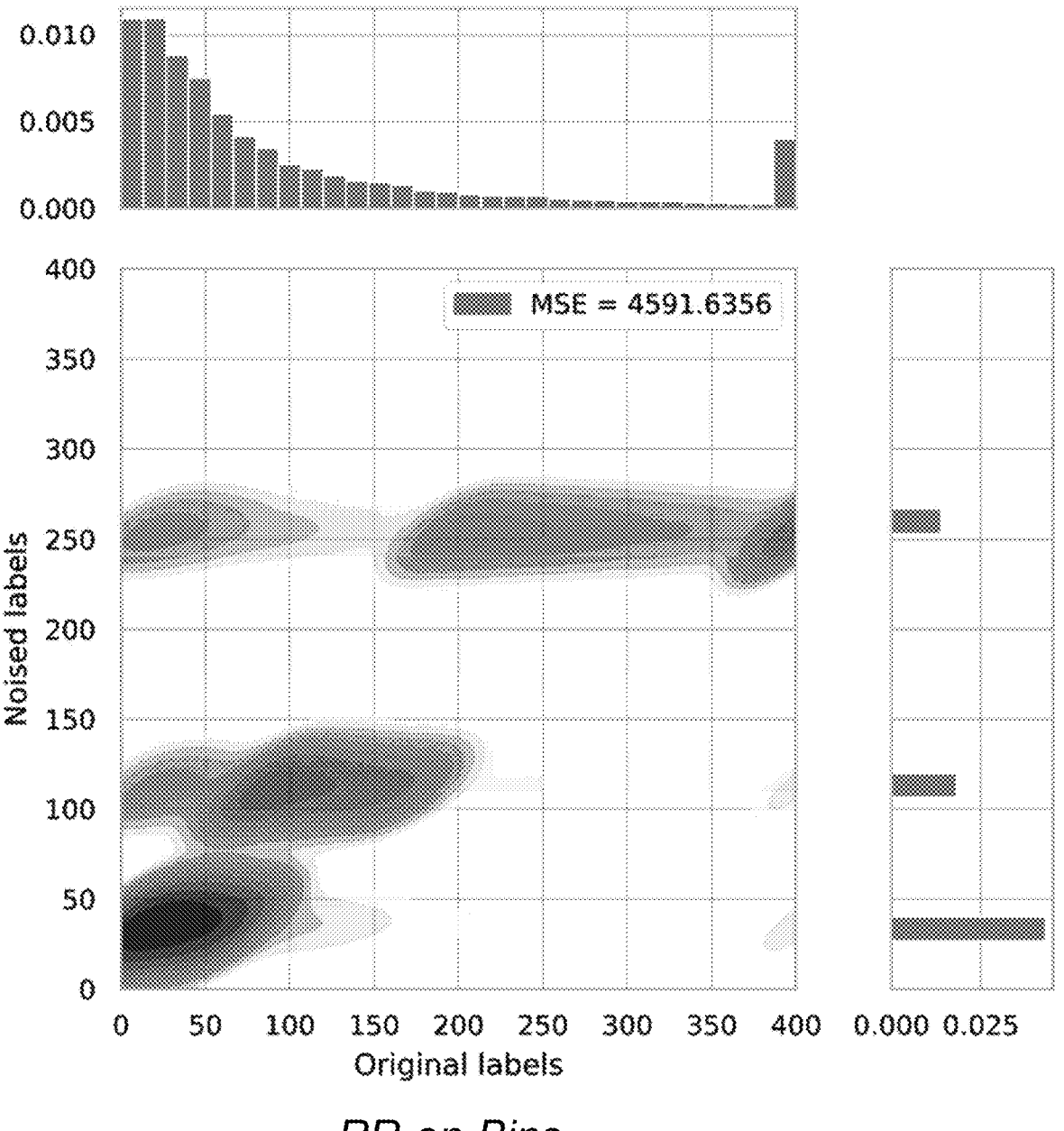
FIG. 7B provides a chart of example results of an example implementation of a technique for generating training datasets according to example aspects of some embodiments of the present disclosure.

FIG. 7A charts the performance of the Laplace Mechanism baseline on the Criteo dataset. FIG. 7B charts the performance of RR-on-bins. The bar chart on top provides a distribution of the input label data. The bar chart on the right side provides a distribution of the output noised label data. The legend provides mean squared error (MSE). The central heat map visualizes how the original labels map to the noised labels. For these results, ε=3. RR-on-bins chooses 3 bins at around 50, 100, and 250 and maps the original labels to those bins. The joint distribution of the original labels and noised labels maintains an overall concentration along the diagonal (e.g., providing stronger correlation).

Table 1 quantitatively compares the two mechanisms across different privacy parameters ε. The first block (Mechanism) shows the MSE between the sensitive training labels and the private labels generated by the two mechanisms, respectively. RR-on-bins can provide significantly smaller MSE than the Laplace mechanism for the same label differential privacy parameter. The reduced noise in the training labels can ultimately lead to lower test errors for models trained on the resulting noised labels, as shown in the second block.

TABLE 1

MSE on the Criteo dataset. The first column block (Mechanism) measures the error introduced by the DP randomization mechanisms on the training labels. The second column block (Generalization) measures the test error of models trained on the corresponding private labels.

| Privacy Param. | MSE (Mechanism) | | MSE (Generalization) | |
|---|---|---|---|---|
| | Laplace Mechanism | RR-on-Bins | Laplace Mechanism | RR-on-Bins |
| 0.05 | 60 746.98 ± 46.31 | 11 334.84 ± 9.07 | 24 812.56 ± 139.35 | 11 339.71 ± 36.45 |
| 0.1 | 59 038.06 ± 51.31 | 11 325.53 ± 9.25 | 23 933.23 ± 172.43 | 11 328.04 ± 36.34 |
| 0.3 | 52 756.01 ± 56.64 | 11 210.48 ± 9.06 | 20 961.83 ± 149.47 | 11 185.20 ± 36.10 |
| 0.5 | 47 253.12 ± 57.12 | 10 977.09 ± 8.85 | 18 411.30 ± 111.82 | 10 901.33 ± 36.54 |

TABLE 1-continued

MSE on the Criteo dataset. The first column block (Mechanism) measures
the error introduced by the DP randomization mechanisms on the training
labels. The second column block (Generalization) measures the test
error of models trained on the corresponding private labels.

| Privacy | MSE (Mechanism) | | MSE (Generalization) | |
| --- | --- | --- | --- | --- |
| Param. | Laplace Mechanism | RR-on-Bins | Laplace Mechanism | RR-on-Bins |
| 0.8 | 40 223.13 ± 48.66 | 10 435.43 ± 9.77 | 15 428.75 ± 91.32 | 10 256.37 ± 37.39 |
| 1.0 | 36 226.54 ± 45.05 | 9 976.86 ± 8.21 | 13 788.51 ± 75.71 | 9 744.08 ± 37.59 |
| 1.5 | 28 170.93 ± 39.45 | 8 636.43 ± 7.04 | 10 808.53 ± 52.31 | 8 406.88 ± 36.57 |
| 2.0 | 22 219.20 ± 28.04 | 7 260.05 ± 10.55 | 8 892.80 ± 32.92 | 7 294.93 ± 34.03 |
| 3.0 | 14 411.77 ± 20.26 | 4 600.24 ± 11.15 | 6 770.33 ± 22.86 | 5 577.50 ± 31.75 |
| 4.0 | 9 851.53 ± 17.27 | 2 631.36 ± 4.41 | 5 764.32 ± 28.95 | 4 769.61 ± 25.01 |
| 6.0 | 5 270.57 ± 10.30 | 709.74 ± 6.18 | 4 955.21 ± 26.75 | 4 371.68 ± 25.31 |
| 8.0 | 3 239.22 ± 6.54 | 176.47 ± 2.12 | 4 668.40 ± 20.34 | 4 333.12 ± 31.94 |
| ∞ | 0.00 ± 0.00 | 0.00 ± 0.00 | 4 322.91 ± 28.31 | 4 319.86 ± 29.27 |

Figure 7C:
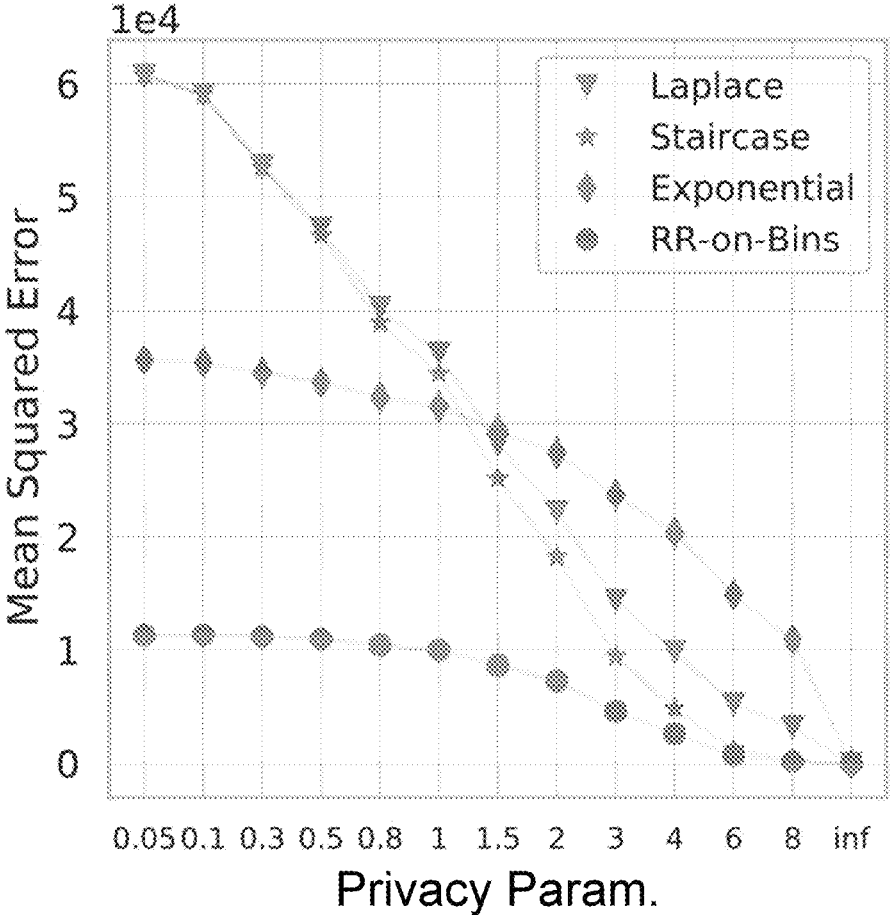
FIG. 7C provides a chart of example results of an example implementation of a technique for generating training datasets according to example aspects of some embodiments of the present disclosure as compared against baselines.
Figure 7D:
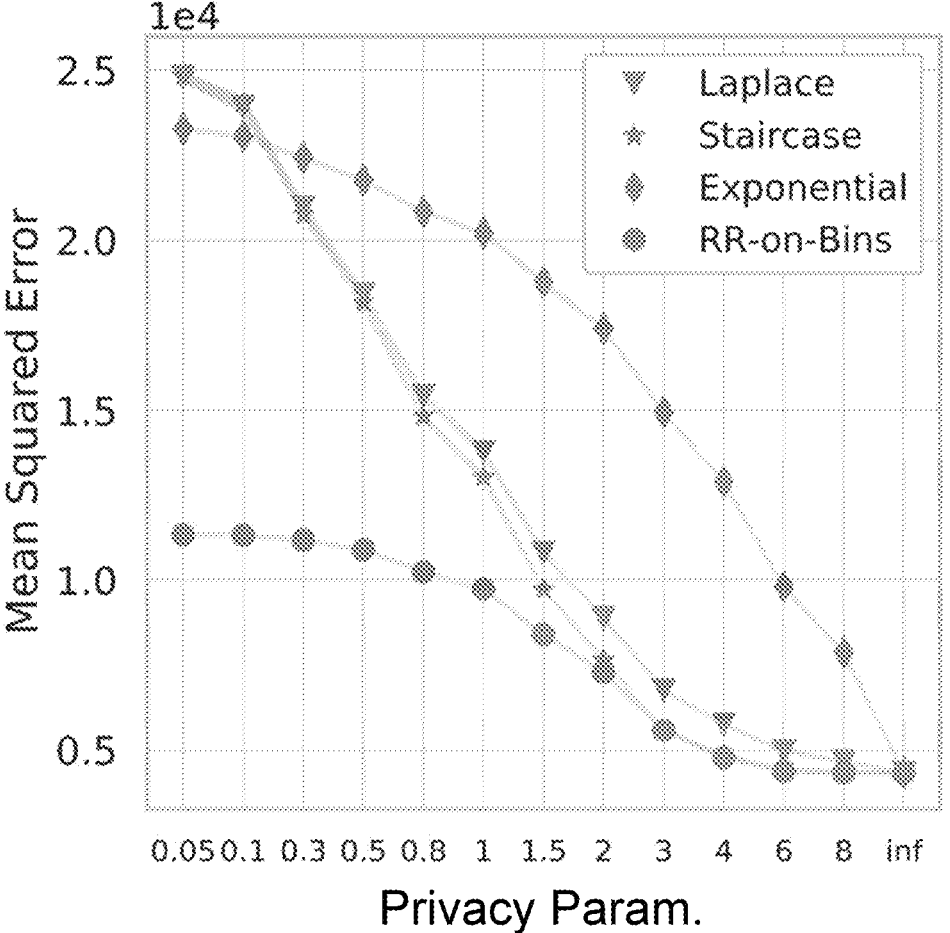
FIG. 7D provides a chart of example results of an example implementation of a technique for generating training datasets according to example aspects of some embodiments of the present disclosure as compared against baselines.

FIGS. 7C and 7D compare RR-on-bins with two additional baselines: the exponential mechanism and the staircase mechanism. For both the "Mechanism" errors (FIG. 7C) and "Generalization" errors (FIG. 7D), RR-on-Bins consistently outperforms the other methods.

Figure 7E:
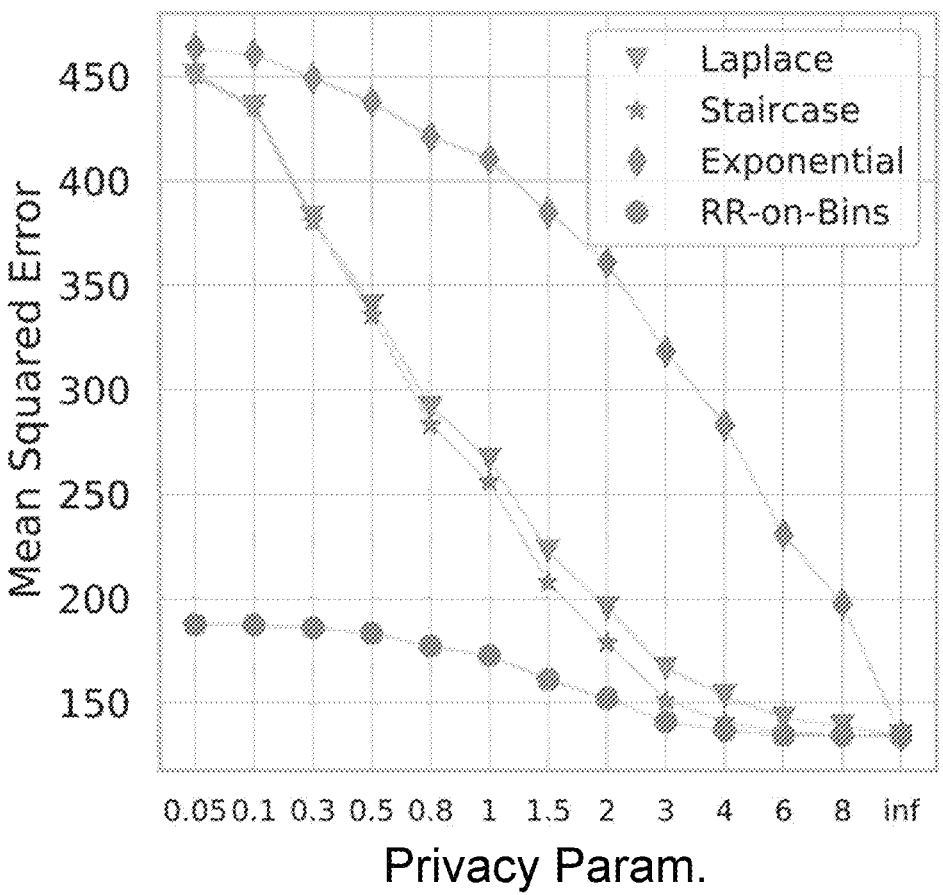
FIG. 7E provides a chart of example results of an example implementation of a technique for generating training datasets according to example aspects of some embodiments of the present disclosure as compared against baselines.

FIG. 7E compares RR-on-bins against the baselines on the US Census dataset.

Figure 7F:
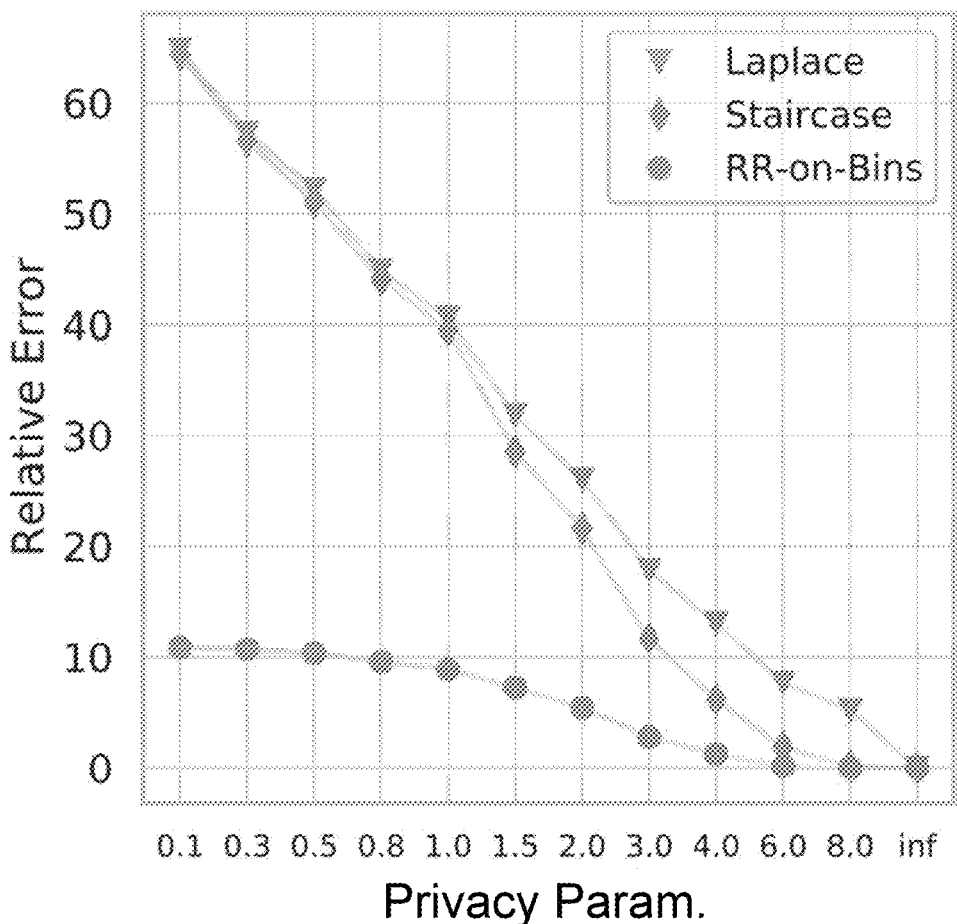
FIG. 7F provides a chart of example results of an example implementation of a technique for generating training datasets according to example aspects of some embodiments of the present disclosure as compared against baselines.

FIG. 7F compares RR-on-bins against the baselines on the App Ads Conversion Count dataset. Here the relative error is calculated with respect to the non-noised baseline (RR-on-bins test error–baseline test error)/(baseline test error).

Further experimental details are provided in Badih Ghazi, Pritish Kamath, Ravi Kumar, Ethan Leeman, Pasin Manurangsi, Avinash Varadarajan, & Chiyuan Zhang, Regression with Label Differential Privacy, arXiv: 2212.06074v1 (Dec. 12, 2022), which is hereby incorporated by reference herein in its entirety.

Example Devices and Systems

Figure 8A:
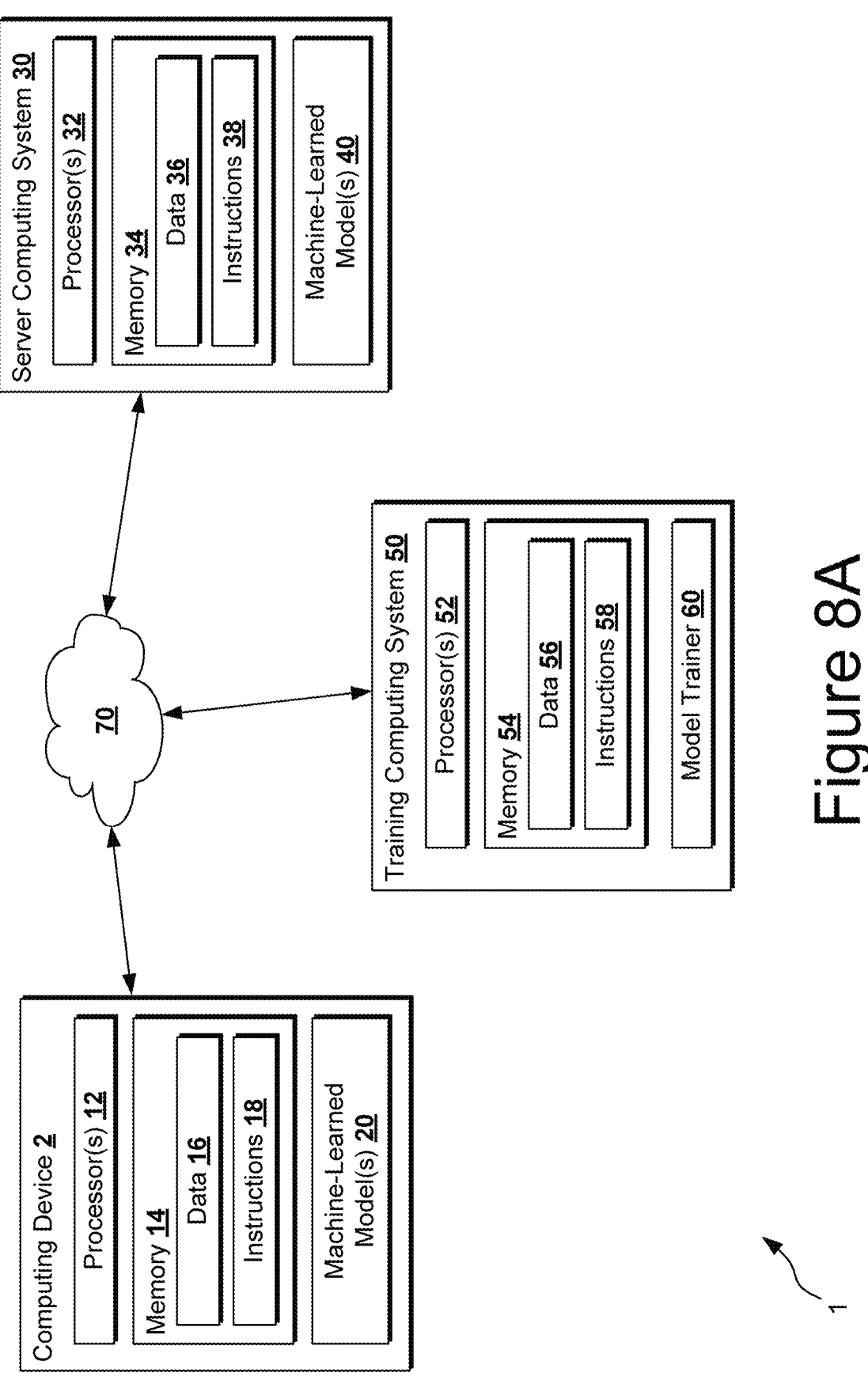
FIG. 8A is a block diagram of an example computing system for generating training datasets according to example aspects of some embodiments of the present disclosure.

FIG. 8A depicts a block diagram of an example computing system 1 that can perform according to example embodiments of the present disclosure. The system 1 includes a computing device 2, a server computing system 30, and a training computing system 50 that are communicatively coupled over a network 70.

The computing device 2 can be any type of computing device, such as, for example, a personal computing device (e.g., laptop or desktop), a mobile computing device (e.g., smartphone or tablet), a gaming console or controller, a wearable computing device, an embedded computing device, or any other type of computing device. In some embodiments, the computing device 2 can be a client computing device. The computing device 2 can include one or more processors 12 and a memory 14. The one or more processors 12 can be any suitable processing device (e.g., a processor core, a microprocessor, an ASIC, an FPGA, a controller, a microcontroller, etc.) and can be one processor or a plurality of processors that are operatively connected. The memory 14 can include one or more non-transitory computer-readable storage media, such as RAM, ROM, EEPROM, EPROM, flash memory devices, magnetic disks, etc., and combinations thereof. The memory 14 can store data 16 and instructions 18 which are executed by the processor 12 to cause the user computing device 2 to perform operations (e.g., to perform operations implementing input data structures and self-consistency output sampling according to example embodiments of the present disclosure, etc.).

In some implementations, the user computing device 2 can store or include one or more machine-learned models 20. For example, the machine-learned models 20 can be or can otherwise include various machine-learned models such as neural networks (e.g., deep neural networks) or other types of machine-learned models, including non-linear models or linear models. Neural networks can include feedforward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multiheaded self-attention models (e.g., transformer models).

In some implementations, one or more machine-learned models 20 can be received from the server computing system 30 over network 70, stored in the computing device memory 14, and used or otherwise implemented by the one or more processors 12. In some implementations, the computing device 2 can implement multiple parallel instances of a machine-learned model 20.

Additionally, or alternatively, one or more machine-learned models 40 can be included in or otherwise stored and implemented by the server computing system 30 that communicates with the computing device 2 according to a client-server relationship.

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model (s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. Statistical data can be, represent, or otherwise include data computed and/or calculated from some other data source. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the machine-learned model(s) can be configured to perform a task that includes encoding input data for reliable and/or efficient transmission or storage (and/or corresponding decoding). For example, the task may be an audio compression task. The input may include audio data and the output may comprise compressed audio data. In another example, the input includes visual data (e.g. one or more images or videos), the output comprises compressed visual data, and the task is a visual data compression task. In another example, the task may comprise generating an embedding for input data (e.g. input audio or visual data).

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

In some embodiments, the machine-learned models 40 can be implemented by the server computing system 30 as a portion of a web service (e.g., remote machine-learned model hosting service, such as an online interface for performing machine-learned model operations over a network on remote servers 30). For instance, the server computing system 30 can communicate with the computing device 2 over a local intranet or internet connection. For instance, the computing device 2 can be a workstation or endpoint in communication with the server computing system 30, with implementation of the model 40 on the server computing system 30 being remotely performed and an output provided (e.g., cast, streamed, etc.) to the computing device 2. Thus, one or more models 20 can be stored and implemented at the user computing device 2 or one or more models 40 can be stored and implemented at the server computing system 30.

The computing device 2 can also include one or more input components that receive user input. For example, a user input component can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 30 can include one or more processors 32 and a memory 34. The one or more processors 32 can be any suitable processing device (e.g., a processor core, a microprocessor, an ASIC, an FPGA, a controller, a microcontroller, etc.) and can be one processor or a plurality of processors that are operatively connected. The memory 34 can include one or more non-transitory computer-readable storage media, such as RAM, ROM, EEPROM, EPROM, flash memory devices, magnetic disks, etc., and combinations thereof. The memory 34 can store data 36 and instructions 38 which are executed by the processor 32 to cause the server computing system 30 to perform operations (e.g., to perform operations implementing input data structures and self-consistency output sampling according to example embodiments of the present disclosure, etc.).

In some implementations, the server computing system 30 includes or is otherwise implemented by one or more server computing devices. In instances in which the server computing system 30 includes plural server computing devices, such server computing devices can operate according to sequential computing architectures, parallel computing architectures, or some combination thereof.

As described above, the server computing system 30 can store or otherwise include one or more machine-learned models 40. For example, the models 40 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models).

The computing device 2 or the server computing system 30 can train example embodiments of a machine-learned model (e.g., including models 20 or 40) using a pretraining pipeline (e.g., an unsupervised pipeline, a semi-supervised pipeline, etc.). In some embodiments, the computing device 2 or the server computing system 30 can train example embodiments of a machine-learned model (e.g., including models 20 or 40) using a pretraining pipeline by interaction with the training computing system 50. In some embodiments, the training computing system 50 can be communicatively coupled over the network 70. The training computing system 50 can be separate from the server computing system 30 or can be a portion of the server computing system 30.

The training computing system 50 can include one or more processors 52 and a memory 54. The one or more processors 52 can be any suitable processing device (e.g., a processor core, a microprocessor, an ASIC, an FPGA, a controller, a microcontroller, etc.) and can be one processor or a plurality of processors that are operatively connected. The memory 54 can include one or more non-transitory computer-readable storage media, such as RAM, ROM, EEPROM, EPROM, flash memory devices, magnetic disks, etc., and combinations thereof. The memory 54 can store data 56 and instructions 58 which are executed by the processor 52 to cause the training computing system 50 to perform operations (e.g., to perform operations implementing input data structures and self-consistency output sampling according to example embodiments of the present disclosure, etc.). In some implementations, the training computing system 50 includes or is otherwise implemented by one or more server computing devices.

The model trainer 60 can include a pretraining pipeline for training machine-learned models using various objectives. Parameters of the image-processing model(s) can be trained, in some embodiments, using various training or learning techniques, such as, for example, backwards propagation of errors. For example, an objective or loss can be backpropagated through the pretraining pipeline(s) to update one or more parameters of the model(s) (e.g., based on a gradient of the loss function). Various determinations of loss can be used, such as mean squared error, likelihood loss, cross entropy loss, hinge loss, or various other loss functions. Gradient descent techniques can be used to iteratively update the parameters over a number of training iterations. In some implementations, performing backwards propagation of errors can include performing truncated backpropagation through time. The pretraining pipeline can perform a number of generalization techniques (e.g., weight decays, dropouts, etc.) to improve the generalization capability of the models being trained.

The model trainer 60 can include computer logic utilized to provide desired functionality. The model trainer 60 can be implemented in hardware, firmware, or software controlling a general-purpose processor. For example, in some implementations, the model trainer 60 includes program files stored on a storage device, loaded into a memory, and executed by one or more processors. In other implementations, the model trainer 60 includes one or more sets of computer-executable instructions that are stored in a tangible computer-readable storage medium such as RAM, hard disk, or optical or magnetic media.

The network 70 can be any type of communications network, such as a local area network (e.g., intranet), wide area network (e.g., Internet), or some combination thereof and can include any number of wired or wireless links. In general, communication over the network 70 can be carried via any type of wired or wireless connection, using a wide variety of communication protocols (e.g., TCP/IP, HTTP, SMTP, FTP), encodings or formats (e.g., HTML, XML), or protection schemes (e.g., VPN, secure HTTP, SSL).

FIG. 8A illustrates one example computing system that can be used to implement the present disclosure. Other computing systems can be used as well. For example, in some implementations, the computing device 2 can include the model trainer 60. In some implementations, the computing device 2 can implement the model trainer 60 to personalize the model(s) based on device-specific data.

Figure 8B:
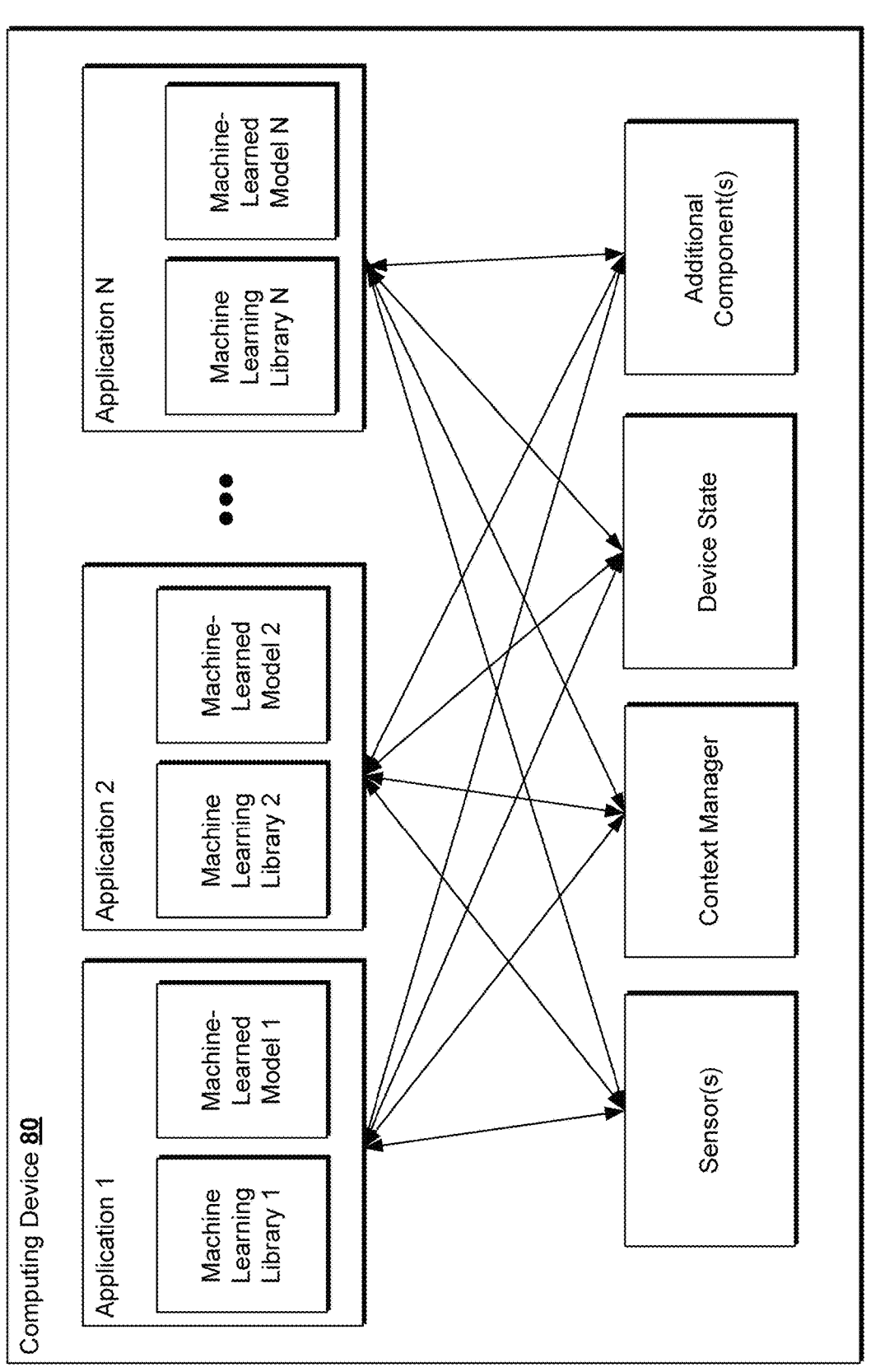
FIG. 8B is a block diagram of an example computing device for generating training datasets according to example aspects of some embodiments of the present disclosure.

FIG. 8B depicts a block diagram of an example computing device 80 that performs according to example embodiments of the present disclosure. The computing device 80 can be a user computing device or a server computing device. The computing device 80 can include a number of applications (e.g., applications 1 through N). Each application can contain its own machine learning library and machine-learned model(s). For example, each application can include a machine-learned model. Example applications include a text messaging application, an email application, a dictation application, a virtual keyboard application, a browser application, etc. As illustrated in FIG. 8B, each application can communicate with a number of other components of the computing device, such as, for example, one or more sensors, a context manager, a device state component, or additional components. In some implementations, each application can communicate with each device component using an API (e.g., a public API). In some implementations, the API used by each application is specific to that application.

Figure 8C:
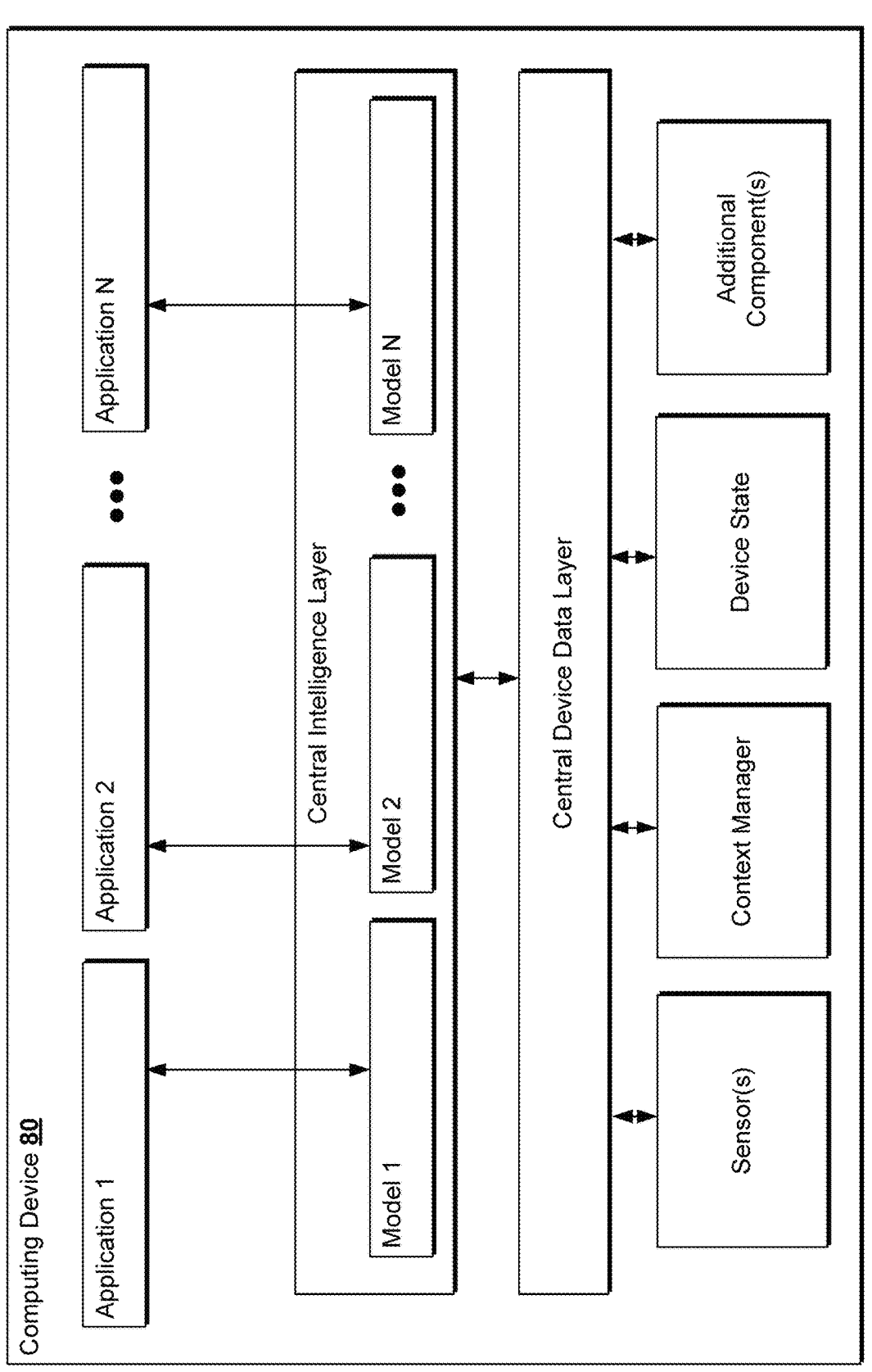
FIG. 8C is a block diagram of an example computing device for generating training datasets according to example aspects of some embodiments of the present disclosure.

FIG. 8C depicts a block diagram of an example computing device 80 that performs according to example embodiments of the present disclosure. The computing device 80 can be a user computing device or a server computing device. The computing device 80 can include a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer can include a number of machine-learned models. For example, as illustrated in FIG. 8C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 80.

The central intelligence layer can communicate with a central device data layer. The central device data layer can be a centralized repository of data for the computing device 80. As illustrated in FIG. 8C, the central device data layer can communicate with a number of other components of the computing device, such as, for example, one or more sensors, a context manager, a device state component, or additional components. In some implementations, the central device data layer can communicate with each device component using an API (e.g., a private API).

Example Methods

FIG. 9 depicts a flow chart diagram of an example method 900 to perform according to example embodiments of the present disclosure. Example method 900 can be implemented by one or more computing systems (e.g., one or more computing systems as discussed with respect to FIGS. 1 to 8C). Although FIG. 9 depicts steps performed in a particular order for purposes of illustration and discussion, the methods of the present disclosure are not limited to the particularly illustrated order or arrangement. The various steps of the method 900 can be omitted, rearranged, combined, and/or adapted in various ways without deviating from the scope of the present disclosure.

At 902, example method 900 can include obtaining initial label data that corresponds to feature data. For instance, initial label data 104 can be obtained. The initial label data 104 can correspond to feature data 108. For instance, initial label data 104 can describe an outcome event associated with an instigating event or earlier context described by feature data 108. For instance, initial label data 104 can describe the occurrence of a user session with a first party system that is associated with (e.g., instigated by, facilitated by, etc.) content delivered from a third party system, with the content delivery and its context being described in feature data 108.

At 904, example method 900 can include determining a plurality of label bins respectively providing representative values for initial label values assigned to the plurality of label bins. For instance, a binning model 114 can map initial label data 104 to a plurality of label bins. Each bin can be associated with a representative value for the bin (e.g., initial labels 114-1 and 114-2 being mapped to representative value 114-3).

At 906, example method 900 can include generating, based on a probability distribution over the plurality of label bins, noised label data corresponding to the initial label data. For instance, although a given initial label 112 can be associated with a particular representative value, the mapping can be noised by randomly sampling over all the label bins. The different label bins can be selected with different probabilities. The representative value for the label bin to which the initial label is actually assigned can be associated with a first probability. The other representative values can be associated with different probability(ies). For instance, in example method 900, the probability distribution can be characterized by, for a respective noised label corresponding to a respective initial label of the initial label data: a first probability for returning a representative value of a label bin to which the respective initial label is assigned, and a second probability for returning another value. In example method 900, the other value can be a representative value of any other label bin to which the respective initial value is not assigned. In example method 900, the first probability can be related to a first privacy parameter value (e.g., positively correlated). The first probability can approach an equal probability over all bins as the privacy parameter value approaches zero.

At 908, example method 900 can include communicating the noised label data for training the machine-learned model. For instance, first computing system(s) 410, 610-1, 610-2, 610-3, or trusted computing system(s) 510 can communicate noised label data over a network connection, system bus, or other communication protocol. Such communication can advantageously maintain a differential privacy guarantee.

In example method 900, the representative values can be determined using an optimization objective that corresponds to expected values of a noise-based loss. In example method 900, the noise-based loss can include a regression loss. In example method 900, the noise-based loss can be determined between noised labels and corresponding initial labels.

In example method 900, the optimization objective can be computed by weighting respective computed values of the noise-based loss based on probabilities associated with the respective computed values. In example method 900, the probabilities associated with the respective computed values can be obtained from a prior distribution of probabilities associated with the initial label data used to compute the noise-based loss.

Example method 900 can include estimating the prior distribution of probabilities. The prior distribution of probabilities can be associated with the initial label data. The prior distribution of probabilities can be associated with one or more other sets of initial label data. Example method 900 can include weighting computed values of the noise-based loss based on the estimated prior distribution of probabilities.

In example method 900, estimating the prior distribution can include determining a histogram over the initial label data. In example method 900, estimating the prior distribution can include injecting noise into the histogram. In example method 900, estimating the prior distribution can include determining the estimated prior distribution. In example method 900, the injected noise can be inversely correlated to a second privacy parameter value.

In example method 900, the noised label data can be generated by a user computing device. In example method 900, the prior distribution can be generated based on a history of initial label data. The history can be truncated based on a recency metric (e.g., a timestamp within a threshold). The initial label data can be associated with a user account corresponding to the user computing device. The prior distribution can be generated by the user computing device. The prior distribution can be generated by a server computing device. The prior distribution can be generated by a server computing device and transmitted to the user computing device. In example method 900, the noised label data can be generated by a user computing device based on a prior distribution obtained from a remote computing device.

In example method 900, the prior distribution can include global prior data generated based on global label data associated with a plurality of user devices.

Example method 900 can include submitting, to an application programming interface of the remote computing device, the initial label data.

Example method 900 can include obtaining, from a plurality of user computing devices, the initial label data. Example method 900 can include generating the noised label data. In example method 900, the noised label data can be aggregated across the plurality of user computing devices.

Example method 900 can include transmitting, to a third-party device, the noised label data. In example method 900, the third-party device can access to the feature data.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

Aspects of the disclosure have been described in terms of illustrative embodiments thereof. Any and all features in the following claims can be combined or rearranged in any way possible, including combinations of claims not explicitly enumerated in combination together, as the example claim dependencies listed herein should not be read as limiting the scope of possible combinations of features disclosed herein. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Clauses and other sequences of items joined by a particular conjunction such as "or," for example, can refer to "and/or," "at least one of", "any combination of" example elements listed therein, etc. Also, terms such as "based on" should be understood as "based at least in part on."

What is claimed is:

1. A computer-implemented method for differentially private communication of training data for training a machine-learned model, the method comprising:
    obtaining, by a computing system comprising one or more processors, initial label data that corresponds to feature data;
    determining, by the computing system, a plurality of label bins respectively providing representative values for initial label values assigned to the plurality of label bins;
    generating, by the computing system and based on a probability distribution over the plurality of label bins, noised label data corresponding to the initial label data, the probability distribution characterized by, for a respective noised label corresponding to a respective initial label of the initial label data:
        a first probability of returning a representative value of a label bin to which the respective initial label is assigned, and a second probability of returning another value;

wherein the probability distribution is shaped by a first privacy parameter value; and communicating, by the computing system, the noised label data for training the machine-learned model.

2. The computer-implemented method of claim 1, wherein the other value is a representative value of any other label bin to which the respective initial label is not assigned.

3. The computer-implemented method of claim 1, wherein the first probability is related to the first privacy parameter value.

4. The computer-implemented method of claim 1, wherein the representative values are determined using an optimization objective that corresponds to expected values of a noise-based loss.

5. The computer-implemented method of claim 4, wherein the noise-based loss comprises a regression loss.

6. The computer-implemented method of claim 4, wherein the noise-based loss is determined between noised labels and corresponding initial labels.

7. The computer-implemented method of claim 4, wherein the optimization objective is computed by weighting respective computed values of the noise-based loss based on probabilities associated with the respective computed values.

8. The computer-implemented method of claim 7, wherein the probabilities are obtained from a prior distribution of probabilities associated with the initial label data used to compute the noise-based loss.

9. The computer-implemented method of claim 8, comprising:

estimating, by the computing system, the prior distribution of probabilities associated with the initial label data; and weighting, by the computing system, computed values of the noise-based loss based on the estimated prior distribution of probabilities.

10. The computer-implemented method of claim 9, wherein estimating the prior distribution comprises:

determining, by the computing system, a histogram over the initial label data;

injecting, by the computing system, noise into the histogram; and determining, by the computing system, the estimated prior distribution.

11. The computer-implemented method of claim 10, wherein the injected noise is inversely correlated to a second privacy parameter value.

12. The computer-implemented method of claim 8, wherein the noised label data is generated by a user computing device, and wherein the prior distribution is generated based on a history of initial label data associated with a user account corresponding to the user computing device.

13. The computer-implemented method of claim 8, wherein the noised label data is generated by a user computing device, and wherein the prior distribution is obtained from a remote computing device.

14. The computer-implemented method of claim 13, wherein the prior distribution comprises global prior data generated based on global label data associated with a plurality of user devices.

15. The computer-implemented method of claim 13, comprising:

submitting, by the computing system and to an application programming interface of the remote computing device, the initial label data.

16. The computer-implemented method of claim 1, comprising:

obtaining, by the computing system and from a plurality of user computing devices, the initial label data; and generating, by the computing system, the noised label data, wherein the noised label data is aggregated across the plurality of user computing devices.

17. The computer-implemented method of claim 16, comprising:

transmitting, by the computing system and to a third-party device, the noised label data.

18. The computer-implemented method of claim 17, wherein the third-party device has access to the feature data.

19. A computing system for conducting differentially private communication of training data for training a machine-learned model, the system comprising:

one or more processors; and one or more non-transitory computer-readable media storing instructions that are executable by the one or more processors to cause the computing system to perform operations, the operations comprising:

obtaining initial label data that corresponds to feature data;

determining a plurality of label bins respectively providing representative values for initial label values assigned to the plurality of label bins;

generating, based on a probability distribution over the plurality of label bins, noised label data corresponding to the initial label data, the probability distribution characterized by, for a respective noised label corresponding to a respective initial label of the initial label data:

a first probability of returning a representative value of a label bin to which the respective initial label is assigned, and a second probability of returning another value;

wherein the probability distribution is shaped by a first privacy parameter value; and communicating the noised label data for training the machine-learned model.

20. One or more non-transitory computer-readable media storing instructions that are executable by one or more processors to cause a computing system to perform operations for conducting differentially private communication of training data for training a machine-learned model, the operations comprising:

obtaining initial label data that corresponds to feature data;

determining a plurality of label bins respectively providing representative values for initial label values assigned to the plurality of label bins;

generating, based on a probability distribution over the plurality of label bins, noised label data corresponding to the initial label data, the probability distribution characterized by, for a respective noised label corresponding to a respective initial label of the initial label data:

a first probability of returning a representative value of a label bin to which the respective initial label is assigned, and a second probability of returning another value;

wherein the probability distribution is shaped by a first privacy parameter value; and communicating the noised label data for training the machine-learned model.

* * * * *